United States Patent

Nagai et al.

[11] Patent Number: 5,863,311
[45] Date of Patent: Jan. 26, 1999

[54] PARTICULATE TRAP FOR DIESEL ENGINE

[75] Inventors: Youichi Nagai; Syunsuke Ban; Tomohiko Ihara, all of Itami; Kiyoshi Kobashi, Mishima; Hiromichi Yanagihara, Gotemba, all of Japan

[73] Assignees: Sumitomo Electric Industries, Ltd., Osaka; Toyota Jidosha Kabushiki Kaisha, Toyota, both of Japan

[21] Appl. No.: 655,181

[22] Filed: May 30, 1996

[30] Foreign Application Priority Data

May 30, 1995 [JP] Japan .................................. 7-131810
Apr. 19, 1996 [JP] Japan .................................. 8-098118

[51] Int. Cl.⁶ ............................ B01D 29/52; B01D 29/54
[52] U.S. Cl. ............................ 55/483; 55/484; 55/499; 55/521; 55/524; 55/525; 55/DIG. 30; 60/311
[58] Field of Search .......................... 55/DIG. 30, 525, 55/524, 499, DIG. 10, 498, 483, 484, 521; 60/311

[56] References Cited

U.S. PATENT DOCUMENTS

| | | | |
|---|---|---|---|
| 4,363,644 | 12/1982 | Sato et al. | 55/DIG. 30 |
| 4,441,899 | 4/1984 | Takagi et al. | 55/DIG. 30 |
| 4,519,820 | 5/1985 | Oyobe et al. | 55/DIG. 30 |
| 5,505,757 | 4/1996 | Ishii | 55/525 |
| 5,709,722 | 1/1998 | Nagai et al. | 55/499 |

FOREIGN PATENT DOCUMENTS

| | | |
|---|---|---|
| 0 469 277 | 2/1992 | European Pat. Off. . |
| 0 501 138 | 9/1992 | European Pat. Off. . |
| 0 606 071 | 7/1994 | European Pat. Off. . |
| 626 188 | 11/1994 | European Pat. Off. . |
| 626 188 A1 | 11/1994 | European Pat. Off. . |
| 0 640 382 | 3/1995 | European Pat. Off. . |
| 884920 | 8/1943 | France . |
| 40 12 719 | 10/1991 | Germany . |
| 41 30 629 | 3/1993 | Germany . |
| 54-110189 | 8/1979 | Japan . |
| 58-45715 | 3/1983 | Japan . |
| 58-137423 | 11/1983 | Japan . |
| 61-42616 | 3/1986 | Japan . |
| 62-149316 | 7/1987 | Japan . |
| 13-04022 | 12/1989 | Japan . |
| 4-339120 | 11/1992 | Japan . |
| 635 654 | 4/1983 | Switzerland . |

*Primary Examiner*—Jay H. Woo
*Assistant Examiner*—Robert Hopkins
*Attorney, Agent, or Firm*—Wenderoth, Lind & Ponack, L.L.P.

[57] ABSTRACT

A particulate trap for a diesel engine use which is less likely to vibrate or deform under exhaust pressures and achieves good results in all of the particulate trapping properties, pressure drop, durability and regenerating properties. This trap has a filter element made of plurality of flat or cylindrical filters. Longitudinally extending exhaust incoming and outgoing spaces are defined alternately between the adjacent filters by alternately closing the inlet and outlet ends of the spaces between the adjacent filters. Gas permeable reinforcing members are inserted in the exhaust outgoing spaces to prevent the filter from being deformed due to the difference between the pressure upstream and downstream of each filter produced when exhausts pass through the filters. Similar gas permeable reinforcing members may also be inserted in the exhaust incoming spaces or at both ends of the filter element to more positively prevent vibration of the filters.

38 Claims, 11 Drawing Sheets

PARTICULATE TRAP FOR DIESEL ENGINE

BACKGROUND OF THE INVENTION

The present invention relates to a particulate trap for trapping and removing particulates such as carbon contained in diesel engine exhausts.

Exhaust gases from automobiles are a major cause of air pollution. It is therefore of extreme importance to develop a technique for removing noxious components in exhausts.

In particular, it is most urgently required to develop a technique for removing particulates components in diesel engine emissions, which are mainly made up of NOx and carbon.

To remove such noxious components in exhausts, Unexamined Japanese Patent Publication 58-51235 proposes to provide an exhaust trap in an exhaust line to trap any noxious components and remove them by after-treatment. Other conventional exhaust purifying means include various improvements in the engine itself such as exhaust gas recirculation (EGR) systems and improved fuel injection systems. But none of them can be a decisive solution. As of today, after-treatment methods are considered more practical as exhaust purifying means. Rigorous efforts are now being made to develop after-treatment type exhaust purifying systems.

It is required that particulate traps for trapping particulates contained in diesel engine emissions satisfy all of the following requirements.

1) Particulate trapping capability

A particulate trap has to be capable of trapping particulate with such high efficiency that exhausts are purified to a satisfactory degree. It is considered necessary to trap an average of at least 60% of the particulates contained in diesel engine emissions, though the amount of particulates contained in exhausts depends upon the displacement of the diesel engine and the load applied.

Airborne particulates 2 $\mu$m or less in diameter can enter human alveoli and reportedly trigger lung cancer. It is thus necessary that particulate traps be capable of efficiently trapping such small suspended particulates.

2) Pressure drop

The particulate trap has to be capable of keeping the pressure drop in exhaust gases to a minimum. If it causes a large pressure drop, a back pressure will act on the engine, aggravating the fuel economy. Thus, it is necessary that the particulate trap have a small initial exhaust pressure drop (when no particulates are trapped). As it traps particulates, its filter tends to be clogged with the trapped particulates, so that the pressure drop will increase gradually. It is necessary to keep the pressure drop to a minimum even after it has trapped a large amount of particulates.

3) Regeneration

The third requirement is that the trap can be regenerated at low energy cost. This is because the particulate trap has to be regenerated or recycled many times for repeated use by burning trapped particulates. An electric heater or a light oil burner is considered as a feasible means for burning off particulates.

4) Durability

Fourthly, the trap has to be sufficiently durable. It has to be highly resistant to corrosion when exposed to hot exhaust gases and to heat shocks produced while burning particulates.

5) Integration with a catalytic converter

Further, it is necessary to provide a catalytic converter integral with the trap. In order to remove noxious gas components in exhausts, a catalytic converter carrying a noxious gas removing catalyst may be provided in an engine exhaust line. If it is desired to further provide a separate particulate trap in the same exhaust line, there may be no available mounting space in the exhaust line. Also, the cost for separately providing such two different kinds of after-treatment type exhaust purifying systems tends to be rather high.

One of the existing filter element materials that satisfy the above-listed requirements is a wall-flow type, honeycomb porous member made of cordierite ceramics. It is considered the most practical.

But this filter has several problems. One problem is that particulates tend to collect locally. Another problem is that, because of low thermal conductivity of cordierite ceramic, this filter tends to develop heat spots during regeneration. As a result, the filter may melt or crack due to thermal stress. Such a filter is not durable enough. Unexamined Japanese Patent Publication 4-265411 proposes to uniformly heat a ceramic foam filter by optimally arranging regenerating heaters. But in this arrangement, the filter supporting portion is relatively small, so that its durability is not so high as a honeycomb porous filter when subjected to vibration or exhaust pressure. A ceramic fiber trap made by forming ceramic fibers into a candle shape is gaining much attention these days. But this trap is not sufficiently durable either, because the fibers forming the trap tend to be broken due to reduced strength when exposed to high-temperature exhaust gases.

Metal traps (as disclosed in Unexamined Japanese Patent Publications 6-257422, 6-294313, 7-731 and 7-51522) are now considered more promising, because they are high in thermal conductivity, less likely to develop heat spots and cracks and highly corrosion-resistant in high-temperature exhausts.

We will discuss problems of conventional metal traps in connection with the abovementioned requirements 1)-5).

Conventional metal traps basically satisfy requirements 1) and 3). But as to the capacity of trapping suspended particulates 2 $\mu$m or less in diameter in requirement 1), higher performance is desired.

As to requirement 2), conventional metal traps can cause a marked pressure drop after trapping particulates. If an especially low engine back pressure is required, these traps will be unsatisfactory. In order to minimize the pressure loss even after the filter element has trapped a large amount of particulates, the filter element has to have a large surface area (filtering area). But in order to increase the filtering area of a conventional metal trap filter element, it is necessary to use an extremely large trap.

In connection with requirement 4) the filter element of a conventional metal trap is deformed microscopically due to the pressure of the introduced exhausts, and can be destroyed due to stress resulting from the microscopic deformation. Also, since the trap is mounted in the exhaust line, its filter element is vibrated together with the trap, which may result in the destruction of the filter element. These problems are observed in harsh endurance tests.

As to requirement 5), it is sometimes necessary to integrally provide a catalytic converter on a conventional metal trap. For example, a catalyst may be integrally carried on a wall-flow type, honeycomb porous member made of a cordierite ceramic, which was originally developed as a DPF. In such a case, it may be difficult to heat the catalyst to a temperature at which it acts because the honeycomb porous member, having a large heat capacity, is slow to heat up.

An object of the present invention is to provide a particulate trap which is free of all the above problems and which satisfies all the requirements 1)-5).

SUMMARY OF THE INVENTION

According to the present invention, there is provided a particulate trap for use in a diesel engine including a filter element comprising a plurality of filters made of unwoven fabrics of metal fibers, the filters defining alternating, longitudinally extending exhaust incoming spaces and exhaust outgoing spaces between the adjacent filters. The exhaust incoming spaces have their outlet ends closed, the exhaust outgoing spaces having their inlet ends closed, and the filter element is mounted in a container provided in an exhaust line of a diesel engine.

Filter reinforcing members permeable to exhaust gases are provided (1) in the exhaust outgoing spaces, (2, at both ends of the filters, or (3) both in the exhaust outgoing spaces and at both ends of the filters.

Such reinforcing members may be further provided in the exhaust incoming spaces.

The reinforcing members provided in the exhaust outgoing spaces and/or exhaust incoming spaces may occupy the entire area of the exhaust outgoing and/or incoming spaces. The reinforcing members provided at both ends of the filters may have protrusions and recesses that engage both ends of the filters.

The reinforcing members provided in the exhaust outgoing and/or incoming spaces may be used in combination with the reinforcing members provided at both ends of the filters.

The reinforcing members have to have larger pores than the filters. Also, they should be as light in weight and small in heat capacity as possible. Thus, they are preferably made of a heat-resistant metal having a material filling rate of 30% or less, in the form of a three-dimensionally reticulated porous member such as foam, wire gauze, metal fiber, unwoven fabric such as felt and so on, corrugated sheet or punching metal.

As a heat-resistant metal, it is preferable to select a metal that will not deteriorate when exposed to exhaust gases at 700° C. for 100 hours, such as a metal containing Fe, Ni or Co with Cr and/or Al added. Depending upon the kind of diesel engine or the conditions of use, higher heat resistance may be needed. Thus, it is preferable to use an Fe—Cr—Al or Ni—Cr—Al alloy, because these alloys will not deteriorate when exposed to exhaust gas at 800° C.

The filters may be made of a heat-resistant metal such as an Fe—Cr—Al or Ni—Cr—Al alloy. In order to keep the filter element from the influence of stress resulting from a difference in thermal expansion when burning particulates for regeneration, the reinforcing members and the filters should be made of the same kind of metal or of metals having similar thermal expansion coefficients. Fe—Cr—Al and Ni—Cr—Al alloys are preferable in this regard, too.

From another aspect of the invention, there is provided a particulate trap for use in a diesel engine including a filter element comprising a plurality of untapered cylindrical or tapered filters made of unwoven fabrics of metal fibers. The filters have different diameters from one another and are arranged concentrically to define alternating, longitudinally extending, concentric exhaust incoming spaces and exhaust outgoing spaces between the adjacent filters and inside the filter of the smallest diameter. The exhaust incoming spaces have their outlet ends closed, the exhaust outgoing spaces having their inlet ends closed, and the filter element is mounted in a container provided in an exhaust line of a diesel engine. The filters having larger diameters are thicker than the filters having smaller diameters.

Preferably, the thicker, outer cylindrical filters have larger pores.

More preferably, the following unwoven fabrics are used:

(1) 0.5-mm-thick unwoven fabrics of metal fibers having fiber diameters of 40 $\mu$m on the exhaust inlet side and 30 $\mu$m on the exhaust outlet side, for cylindrical filters 35 mm or less in diameter;

(2) 1.0-mm-thick unwoven fabrics of metal fibers having fiber diameters; of 30 $\mu$m on the exhaust inlet side and 20 $\mu$m on the exhaust outlet side, for cylindrical filters 35 mm–70 mm in diameter; and (3) 1.5-mm-thick unwoven fabrics of metal fibers having fiber diameters of 20 $\mu$m on the exhaust inlet side and 15 $\mu$m on the exhaust outlet side, for cylindrical filters 70 mm–105 mm in diameter.

In order to efficiently catch suspended particulates, alumina whiskers may be grown on the surface of the heat-resistant metal fiber substrate forming each filter of any of the above filter elements.

Catalysts may be carried on the filters of any of the abovementioned filter elements to provide a particulate trap having the function of a catalytic converter. The catalysts may be carried on one or both sides of the filters made of unwoven fabrics of heat-resistant metal fibers, or may be carried on three-dimensionally reticulated porous members made of a heat-resistant metal provided on one or both sides of the unwoven fabrics with continuous pores.

The particulate trap according to one aspect of present invention has a filter element comprising a plurality of filters made of unwoven fabrics of metal fibers. The filters define alternating, longitudinally extending exhaust incoming spaces and exhaust outgoing spaces between the adjacent filters. The exhaust incoming spaces have their outlet ends closed, and the exhaust outgoing spaces have their inlet ends closed. Simply by reducing the spaces between the flat filters, it is possible to considerably increase the filtering area without increasing the size of the trap. The filter reinforcing members inserted in the exhaust outgoing spaces or provided at both ends of the filters are permeable to exhaust and have a very low metal filling rate compared to the filter element. An additional pressure drop is thus kept to a minimum by the addition of the reinforcing members. Even if filters having small pore diameters are used to improve the particulate trapping efficiency, they will be less likely to clog because the filtering area is large. The pressure drop is thus kept to a minimum.

The reinforcing members prevent any small deformation of the filters due to the pressure of exhausts that pass through the particulate trap. Since the filters are not deformed, no stress will act thereon. The filter element is thus less likely to be destroyed, so that its durability improves. The filters are deformed due to a difference between the pressures upstream and downstream of each filter in such a way that the exhaust outgoing spaces bulge into a moderately curving shape, while the exhaust incoming spaces shrink correspondingly. Thus, by inserting reinforcing members in the exhaust outgoing spaces to fill the entire area of the exhaust outgoing spaces, it is possible to effectively prevent the deformation of filters.

By providing reinforcing members both in the exhaust incoming and outgoing spaces, they prevent the deformation of the filters in the direction perpendicular to the filter surfaces, due to vibration of the filters. Since the filters are not deformed, no stress will act thereon. The filter element is thus less likely to be destroyed, so that its durability improves. The filters are vibrated or deformed in a direction perpendicular to the filter surfaces so that the exhaust gas incoming and outgoing spaces will alternately bulge and shrink. Thus, by inserting the reinforcing members in the exhaust incoming and outgoing spaces so as to fill the entire area of the exhaust incoming and outgoing spaces, it is possible to effectively prevent the deformation of the filters.

By supporting the filter ends with the reinforcing members, the filters can be supported at both ends. The filters are thus less likely to vibrate and thus less likely to suffer fatigue failure resulting from vibration. By using all of the abovementioned reinforcing members in combination, it is possible to suppress both vibration and deformation of the filters and thus to greatly improve the durability of the filter element.

By using reinforcing members low in material filling rate and having larger pores, it is possible to prevent excessive pressure drop due to the clogging of the reinforcing members and thus to prevent any bad influence on the particulate trapping properties. Also, by using reinforcing members having a low metal filling rate, it is possible to reduce the weight and heat capacity of the particulate trap. Also, such reinforcing members will scarcely increase the energy for regeneration.

A stress applied to a thin cylindrical shell member due to external pressure is proportional to the radius of the cylindrical shell. Thus, the larger the radius of the cylindrical shell, the more it is likely to buckle (the stress that causes buckling of the cylindrical shell is proportional to the first to third power of its radius). In another aspect, the outer cylinders, which are subjected to a larger stress and likely to buckle at a lower pressure, are made of thicker filter materials. Thus, the stress applied to the outer, larger-diameter cylindrical filters decreases to substantially the same level as the stress applied to the inner, smaller-diameter filters, so that the former are less likely to buckle. The stress applied to a filter is inversely proportional to its thickness, while the stress that causes the buckling of the filter is inversely proportional to the first to third power of its thickness. Thus, by forming the outer filters from thicker filter materials, it is possible to minimize the difference in the stress applied and the resistance to buckling between the outer and inner filters. Thus, it is possible to reduce the possibilities of buckling of both the outer and inner filters to substantially equal degrees.

In an arrangement in which the thicker, outer filters have larger pores, it is possible to suppress the increase in pressure drop due to increased thicknesses of the outer filters. By determining the thickness of each filter corresponding to its radius, it is possible to adjust the filter thicknesses to optimum values with no too-thick filters present, so that the weight and heat capacity of the entire trap can be kept to a minimum. With this arrangement, the energy needed to burn trapped particulates is substantially the same as when burning particulates trapped by filters of the same thickness.

In an arrangement in which the pore diameter of the filter element decreases gradually from the exhaust inlet side to outlet side, it is possible to trap particulates uniformly over the entire thickness of each filter, so that the exhaust pressure is less likely to drop. The pressure difference life is thus prolonged.

In an arrangement wherein the spaces between the adjacent filters are 10 mm or less wide, it is possible to improve the particulate trapping efficiency without increasing the size of the trap, because the smaller the spaces between the filters, the larger the filtering surface area.

In an arrangement wherein a catalyst is carried on one or either side of each filter made of an unwoven fabric of heat-resistant metal fibers, or in an arrangement in which a catalyst is carried on a three-dimensionally reticulated porous member in the form of a heat-resistant metal framework having continuous holes and provided on one or either side of the unwoven fabric of heat-resistant metal fibers, the particulate trap acts as a catalytic converter as well. Since the catalysts are carried on metal substrates having a low metal filling rate and thus a low heat capacity, the catalysts can be heated quickly to the temperature at which the catalysts act.

By growing alumina whiskers on the surface of the filters made of heat-resistant metal fibers, it is possible to sufficiently reduce pores in the filters. Such filters can trap suspended particulates with diameters of 2 $\mu$m and under.

If the surface on which the alumina whiskers are grown is used to carry a catalyst, such alumina whiskers will serve to increase the area of this surface.

By providing reinforcing members both in the exhaust incoming and outgoing spaces, they prevent the deformation of the filters in the direction perpendicular to the filter surfaces, due to vibration of the filters. Since the filters are not deformed, no stress will act thereon. The filter element is thus less likely to be destroyed, so that its durability improves. The filters are vibrated or deformed in a direction perpendicular to the filter surfaces so that the exhaust gas incoming and outgoing spaces will alternately bulge and shrink. Thus, by inserting the reinforcing members in the exhaust incoming and outgoing spaces so as to fill the entire area thereof, the filters are less likely to be destroyed;

BRIEF DESCRIPTION OF THE DRAWINGS

Other features and objects of the present invention will become apparent from the following description made with reference to the accompanying drawings, in which:

BRIEF DESCRIPTION OF THE DRAWINGS

Figure 1A:
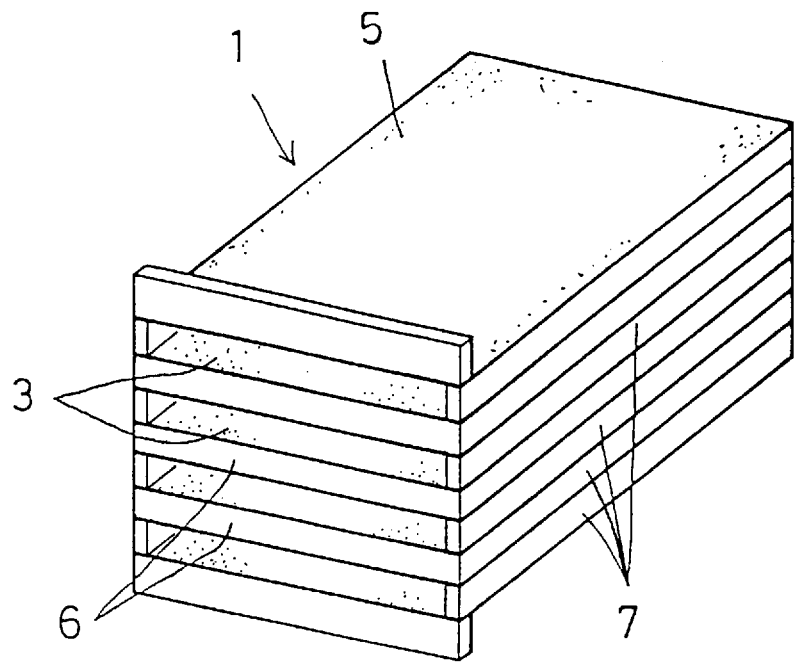
Figure 1B:
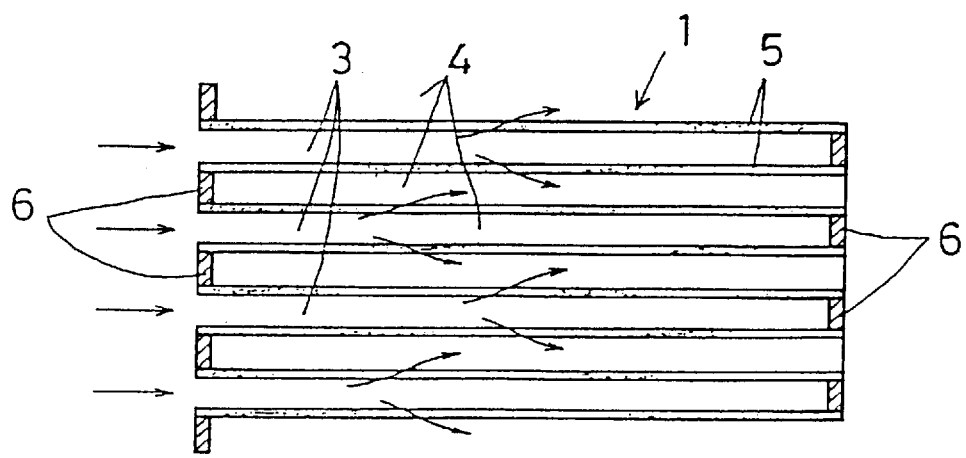
Figure 2A:
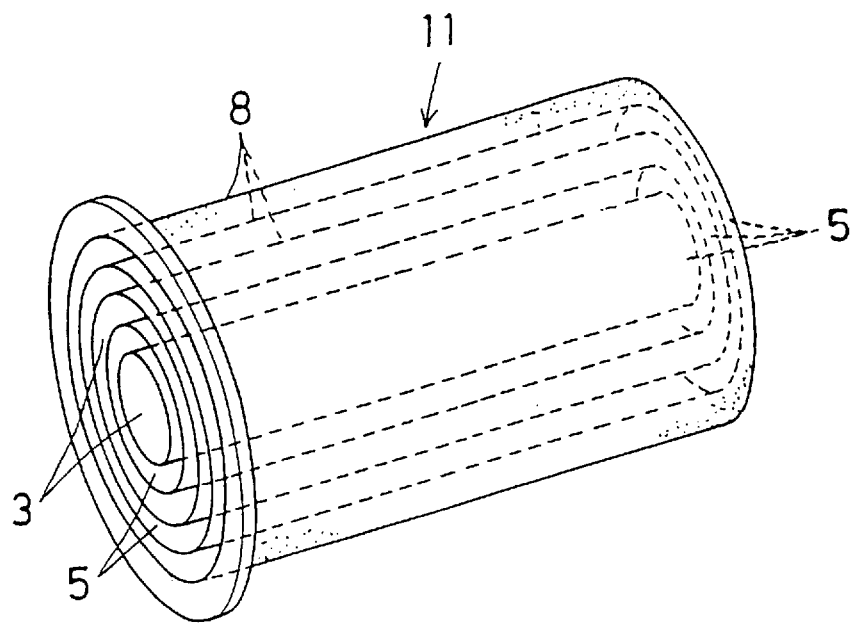
Figure 2B:
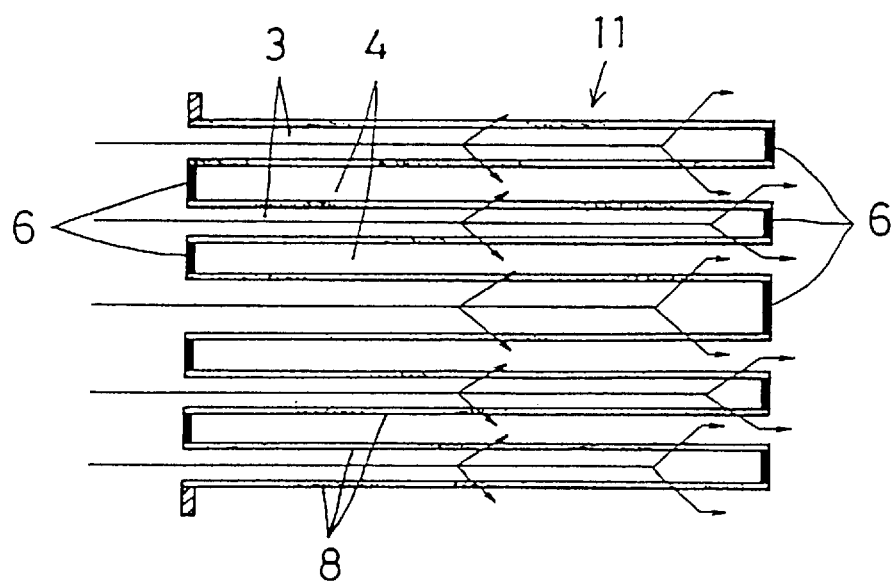
Figure 3A:
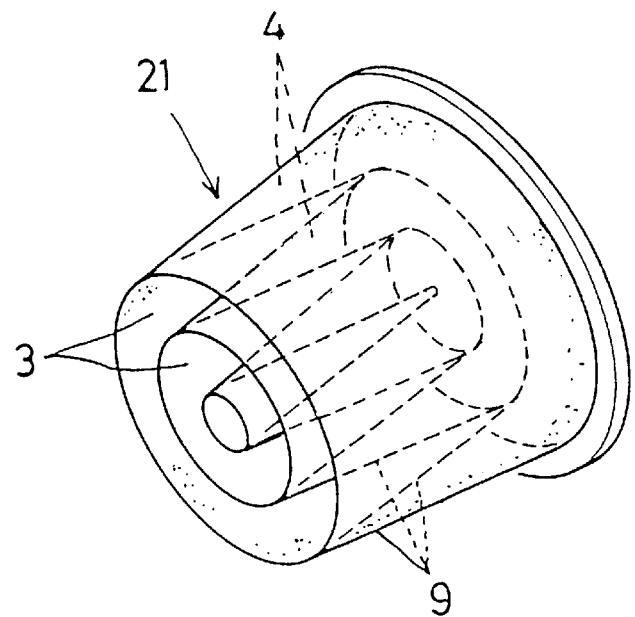
Figure 3B:
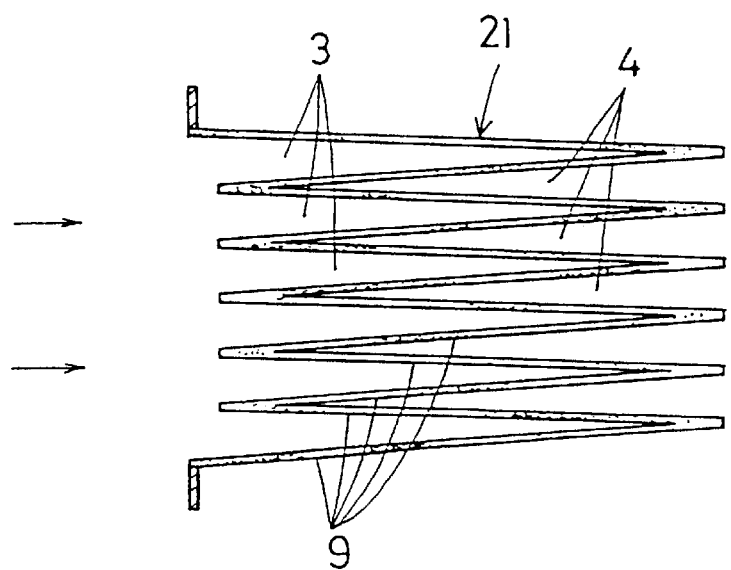
Figure 4:
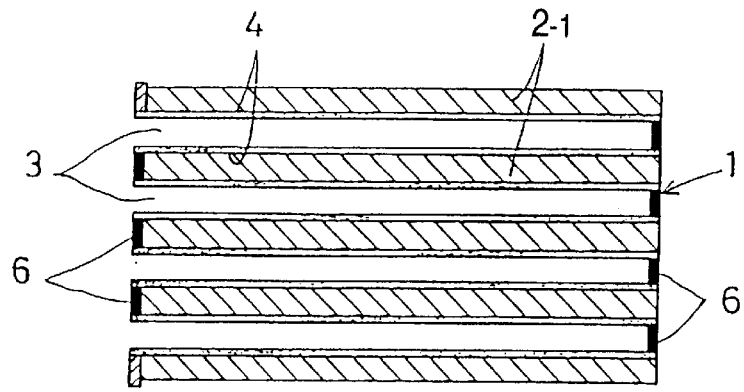
Figure 10:
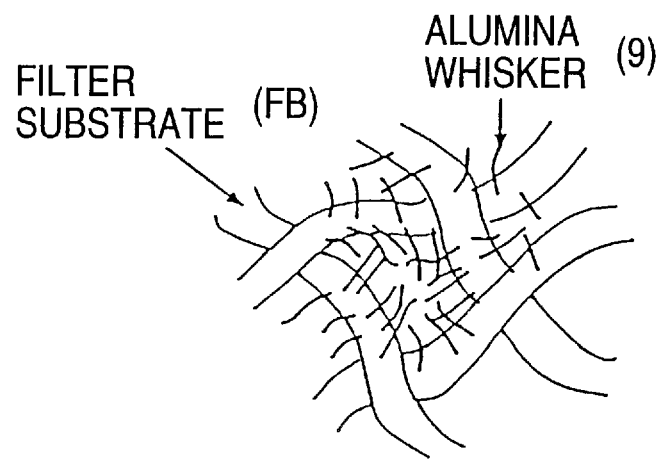
Figure 11:
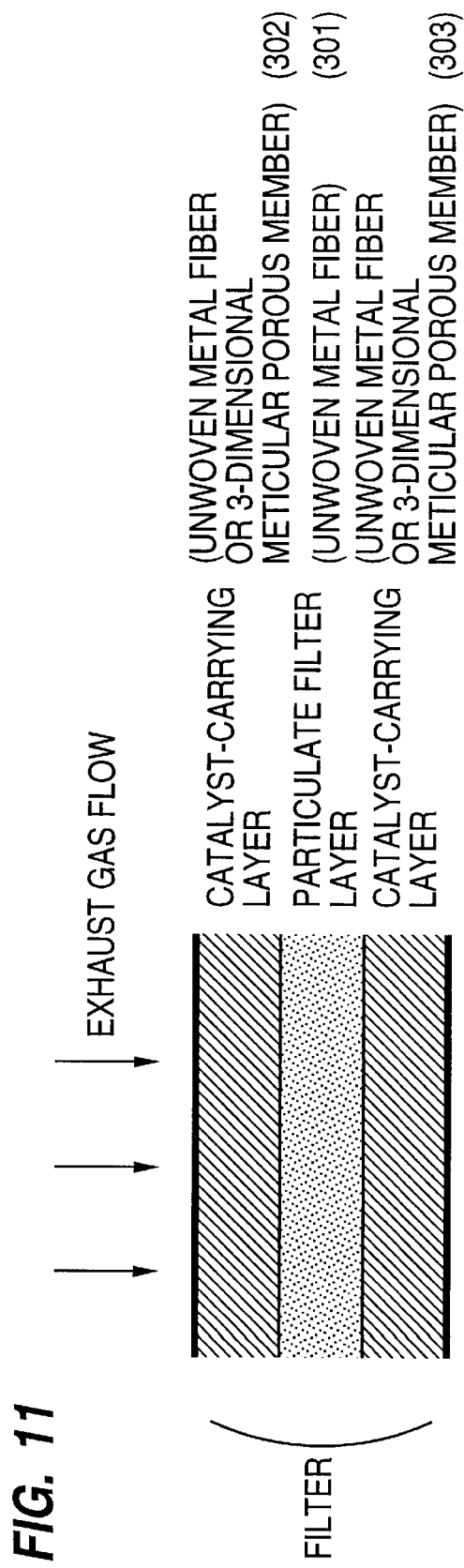
Figure 12:
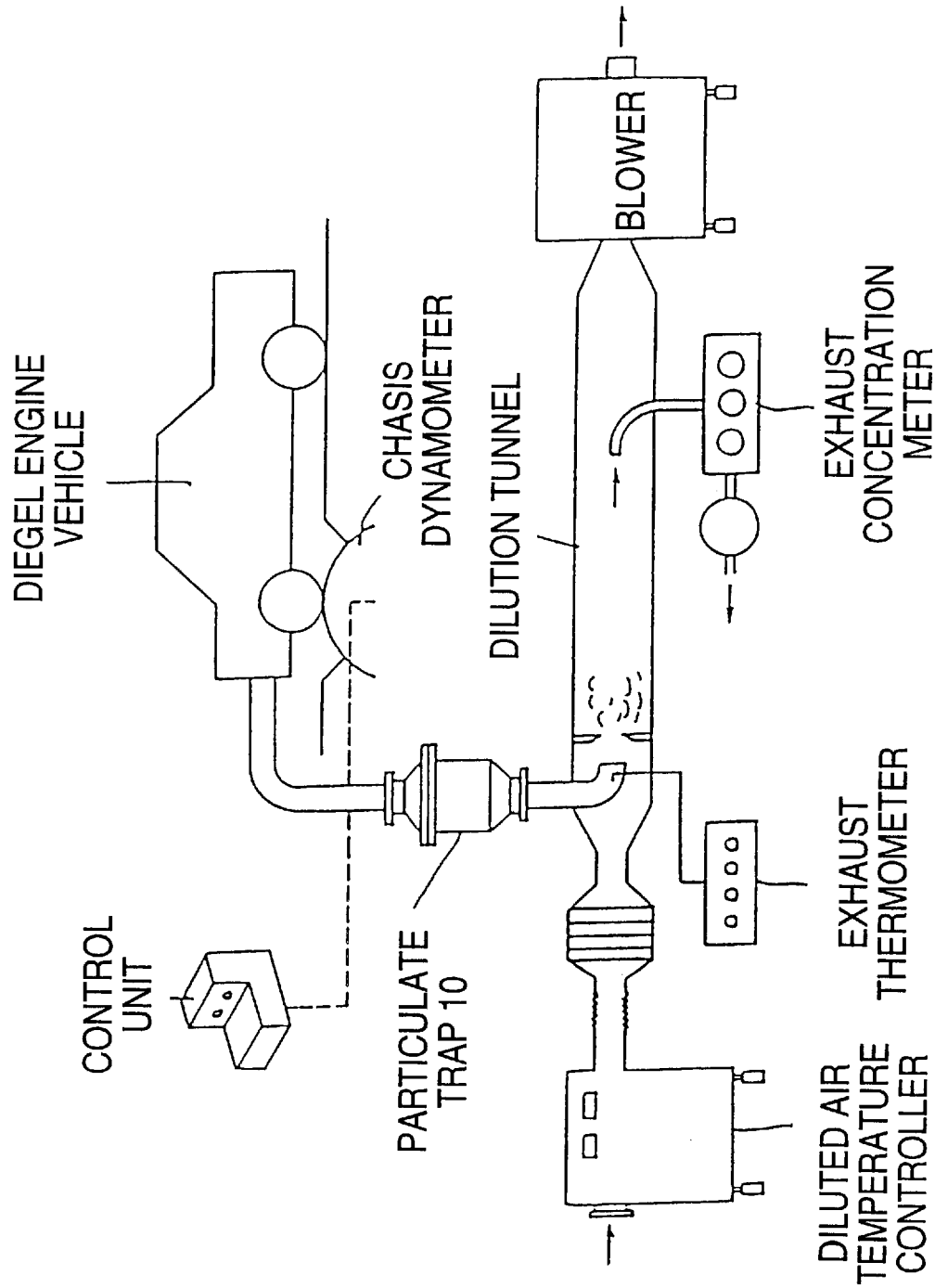
Figure 13A:
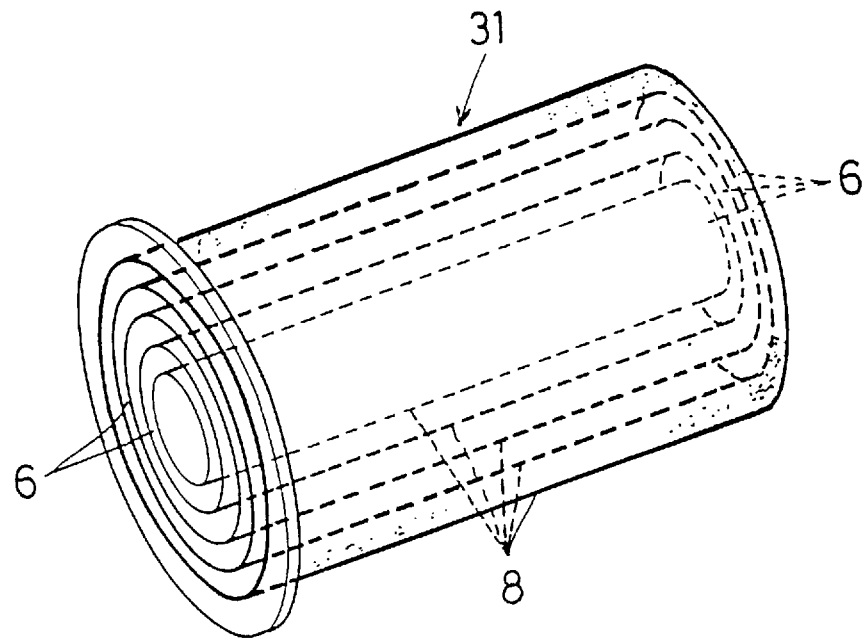
Figure 13B:
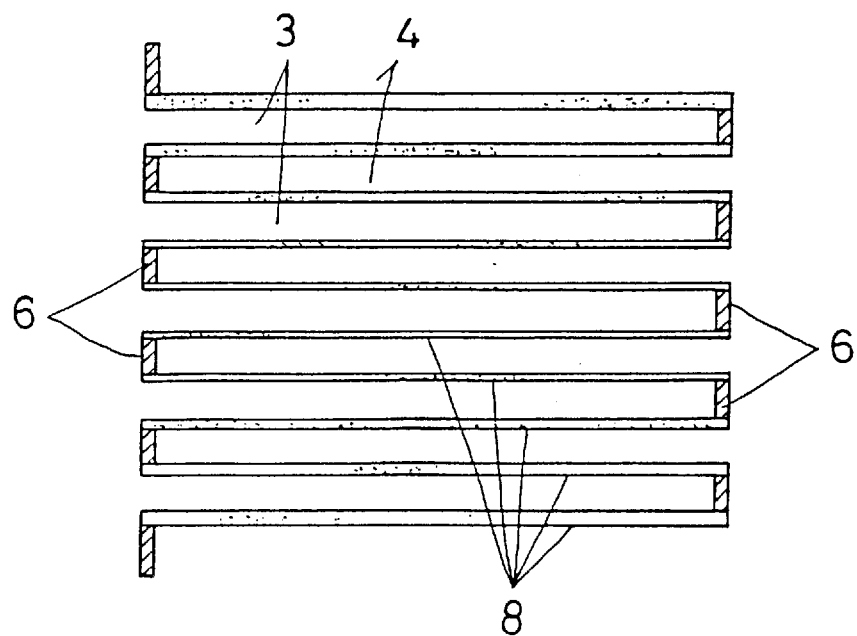
Figure 14A:
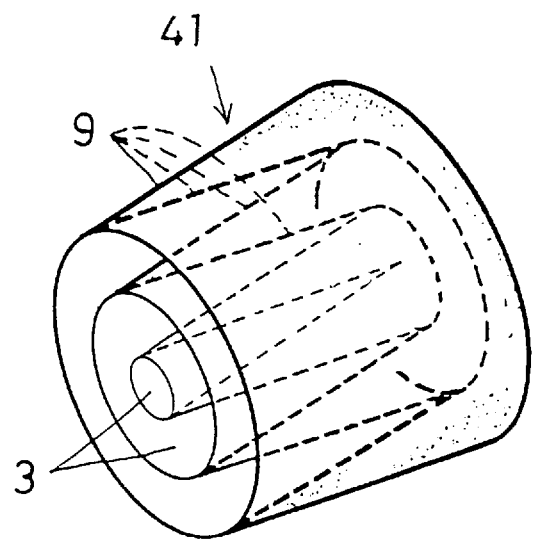
Figure 14B:
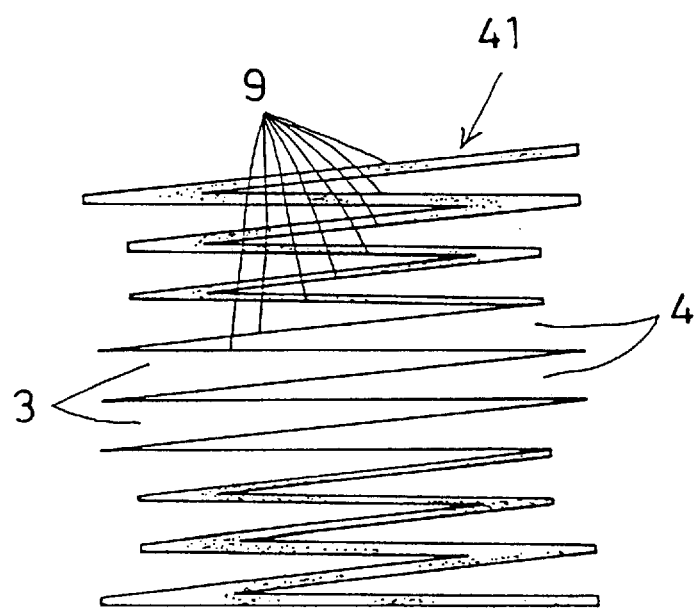
Figure 15:
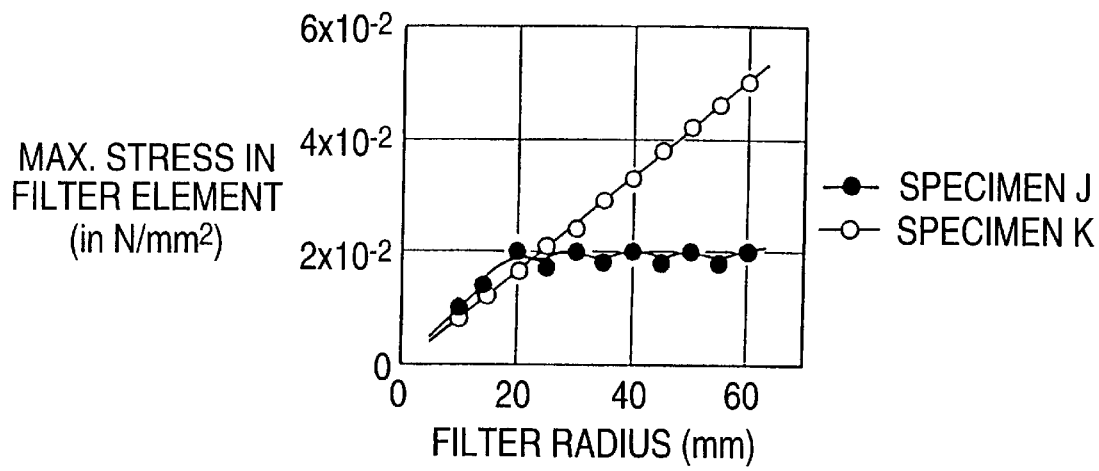
Figure 16:
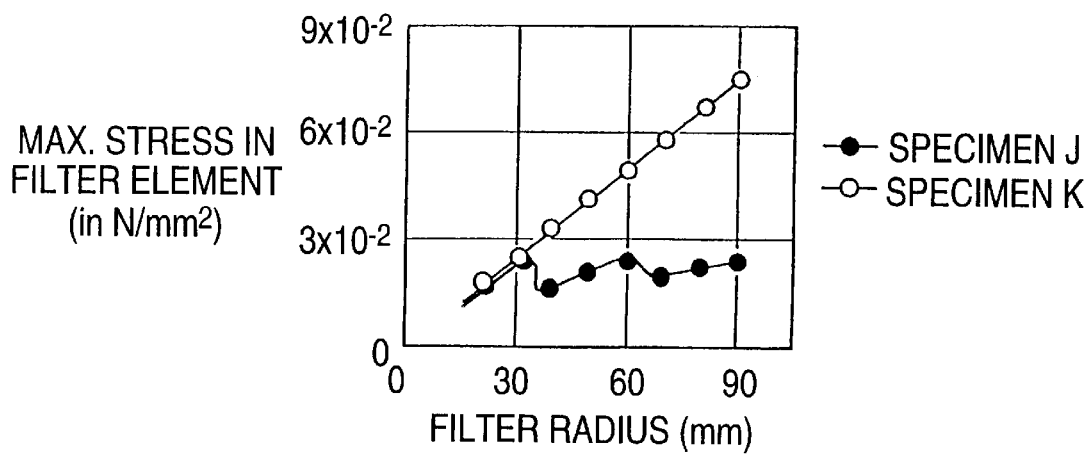

FIG. 1A is a perspective view of a filter element on which the improvement according to the present invention is to be made;

FIG. 1B is a vertical sectional view of the same;

FIG. 2A is a perspective view of another filter element on which the improvement according to the present invention is to be made;

FIG. 2B is a vertical sectional view of the same;

FIG. 3A is a perspective view of still another filter element on which the improvement according to the present invention is to be made;

FIG. 3B is a vertical sectional view of the same;

FIG. 4 is a sectional view of an embodiment of a filter element for a particulate trap according to the present invention;

FIG. 5–9 are sectional views of other embodiments;

FIG. 10 is a schematic view showing alumina whiskers grown on a filter framework;

FIG. 11 is a enlarged view of a filter section;

FIG. 12 is a schematic view of a property evaluation experiment device;

FIG. 13A is a schematic view of an embodiment of a filter element according to a further aspect of the present invention;

FIG. 13B is a sectional view of the filter element of FIG. 13A;

FIG. 14A is a schematic view of another embodiment of the filter element to a further aspect of the present invention;

FIG. 14B is a sectional view of the filter element of FIG. 14A;

FIG. 15 is a graph showing the relationship between the maximum stress and the filter radius for Specimens J and K; and FIG. 16 is a graph showing the relationship between the maximum stress and the filter radius for Specimens L and M.

DETAILED DESCRIPTION OF THE PREFERRED EMBODIMENT

FIGS. 4–7 show embodiments of a filter element for use in a particulate trap of the present invention. These filter elements are the same as filter elements 1, 11 and 21 shown in FIGS. 1–3 except that reinforcing members are added.

The filter element 1 shown in FIG. 1 comprises a plurality of flat filters 5 arranged in parallel, end plates 6 alternately closing the inlet and outlet ends of the spaces between the adjacent filters 5, and liners 7 (which may be integral with the end plates 6) closing both sides of the spaces. The filters 5, end plates 6 and liners 7 define, in cooperation, alternating exhaust incoming spaces 3 and exhaust outgoing spaces 4.

The filter element 11 shown in FIG. 2 comprises a plurality of untapered column-shaped (cylindrical in the example shown) filters 8 analogous in section with different diameters and arranged concentrically with each other, and end plates 6 alternately closing the inlet and outlet ends of the spaces between the adjacent filters, thereby defining the alternating exhaust incoming spaces 3 and exhaust outgoing spaces 4.

The filter element 21 shown in FIG. 3 comprises a plurality of tapered column-shaped (conical in the example shown) filters 9 having different diameters from one another and arranged concentrically, with adjacent ones directed in opposite directions to each other so that the adjacent filters are connected together at their respective one and the other ends. The filter element has a zigzag section as a whole, as shown in FIG. 3B, with the alternating exhaust inlet spaces 3 and exhaust outlet spaces 4 defined between the adjacent filters 9.

The filters of each of the filter elements 1, 11 and 12 are made of unwoven fabrics of metal fibers. To reduce the size of the entire trap and to efficiently regenerate the filters, the width of the spaces 3, 4 between the adjacent filters is preferably 10 mm or less.

The filter element of the embodiment shown in FIG. 4 may be any of the filter elements 1, 11 and 21 (though only the filter element 1 is shown in FIG. 1). It has air permeable reinforcing members 2-1 inserted in the exhaust outgoing spaces 4 to support the filters opposite to each other on both sides of each space 4.

Figure 5:
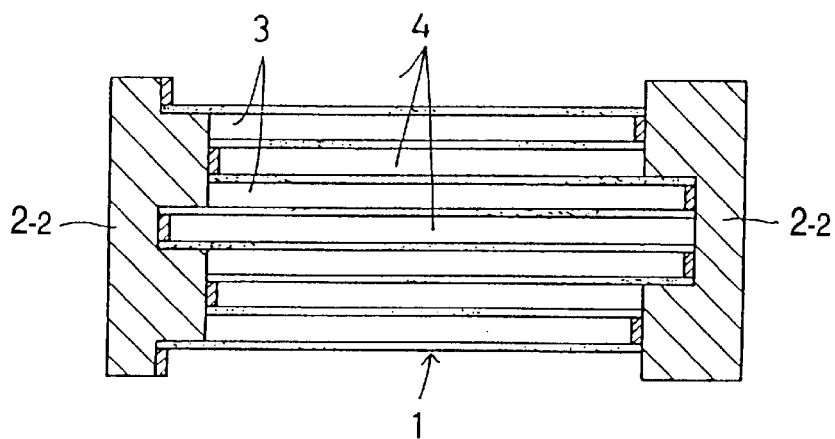

The filter element shown in FIG. 5 has reinforcing members 2-2 at both ends thereof. They have protrusions and recesses that engage both ends of the filters positioned so as to extend across the entire section of the filter element and thus across the ends of all of the filters of the filter element.

Figure 6:
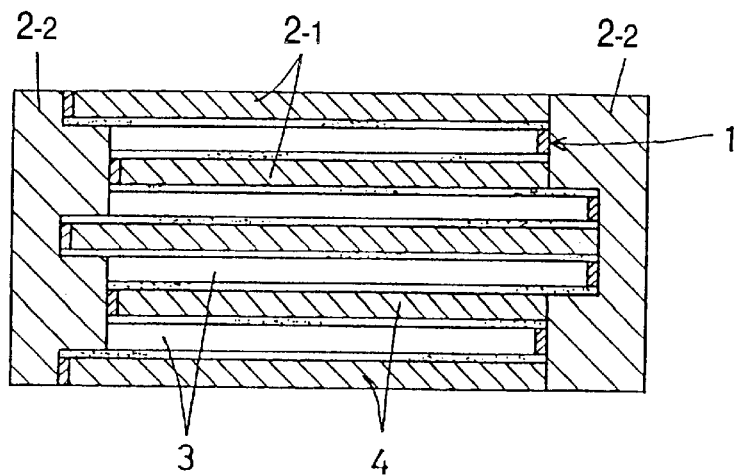

The filter element shown in FIG. 6 has both the reinforcing members 2-1 and 2-2 shown in FIGS. 4 and 5.

Figure 7:
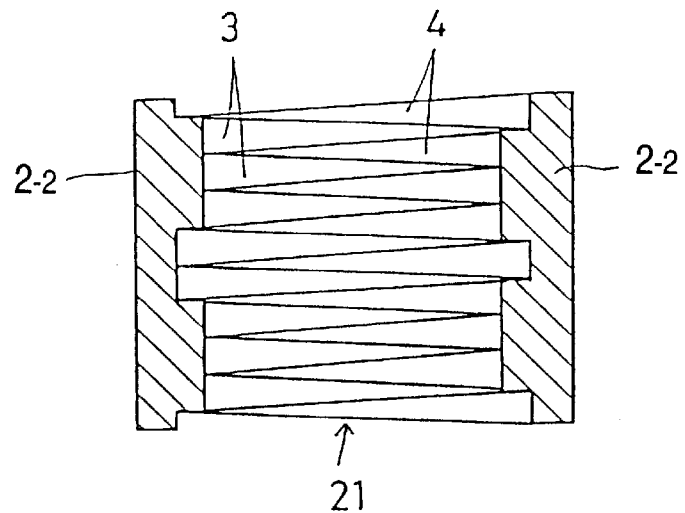

The filter element shown in FIG. 7 has the same filters as those shown in FIG. 3, or has filters formed by bending flat filters in a zigzag manner so that they have the same section as the filters shown in FIG. 3B. Both sides of the spaces between filters are closed by liners. Reinforcing members 2-2 are provided at both ends of the filter element positioned so as to extend across the entire section of the filter element and thus across the ends of all of the filters of the filter element.

The filter elements shown in FIGS. 5, 6 and 7 have their filters in engagement with the recesses and protrusions of the reinforcing members 2-2 by arranging the dead ends of the spaces 3 and 4 in a staggered manner. But by using reinforcing members 2-2 having a suitable shape, it is possible to stably support the filters by bringing the filters into engagement with the protrusions and recesses of the reinforcing members without the need to stagger the dead ends of the spaces 3 and 4.

Figure 8:
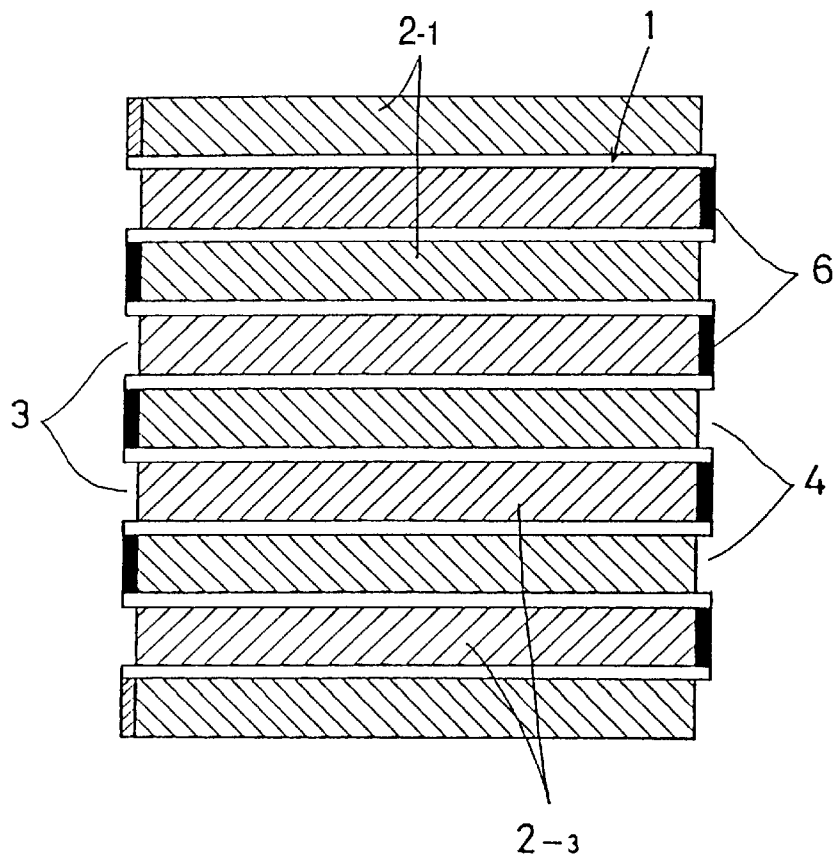
Figure 9:
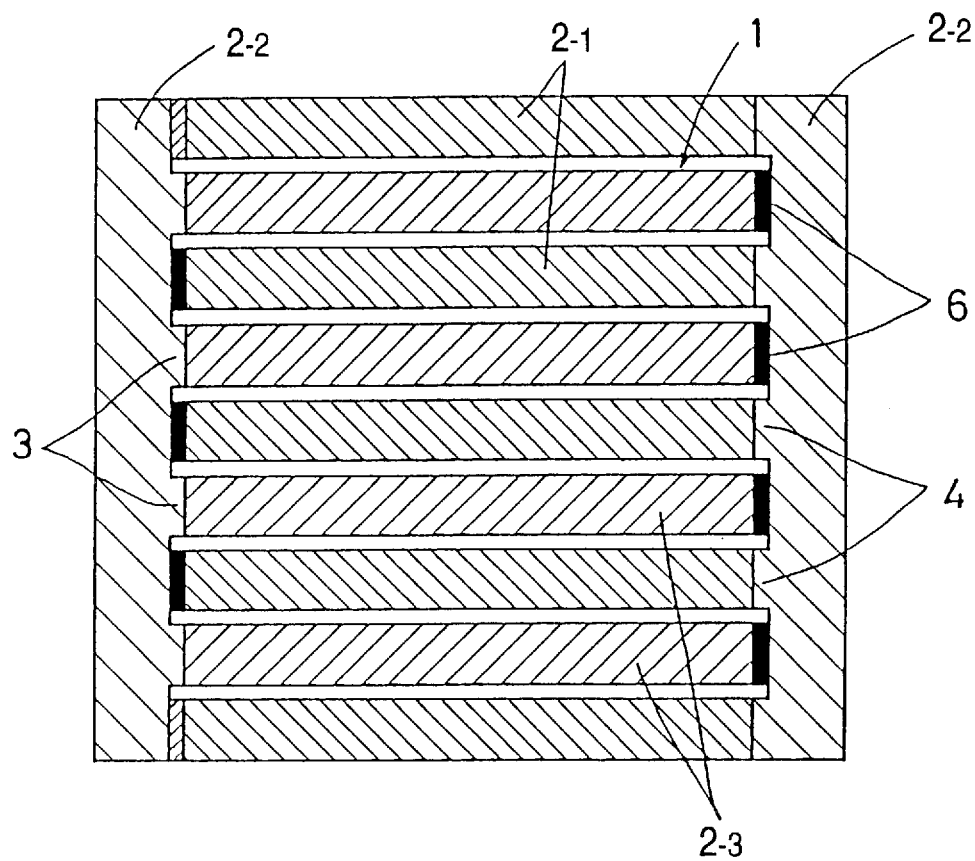

The filter element of the embodiment shown in FIG. 8 may be any of the filter elements 1, 11 and 21 (though only the filter element 1 is shown). It has air permeable reinforcing members 2-1 and 2-3 inserted in the exhaust incoming spaces 3 and exhaust outgoing spaces 4, respectively, to support the filter element. The filter element shown in FIG. 9 is the same as the filter element shown in FIG. 8 with the reinforcing members 2-2 further added thereto positioned so as to extend across the entire section of the filter element and thus across the ends of all of the filters of the filter element.

The reinforcing members 2-1 and 2-2 should be formed from a metal that will not deteriorate even when exposed to 700° C. exhaust gases for 100 hours. Such metals include Fe—Cr—Al alloy and Ni—Cr—Al alloy, which are also used as filter materials. Considering the pressure difference produced between upstream and downstream sides of the filters, the reinforcing members should have a strength sufficient to withstand the pressure of 0.3 kg/cm$^2$ at 700° C. For this purpose, the metal filling rate cannot be reduced below a certain point, though this point depends on the kind of the metal used. The reinforcing members may be formed from a three-dimensionally reticulated porous member having a packing density of 30% or less, wire gauze, unwoven metal fabric, punching metal or corrugated sheet. If a corrugated sheet is used, the volume of a rectangular space in which the sheet fits tightly is regarded as the volume of the sheet.

The reinforcing members 2-3 are also formed from a three-dimensionally reticulated porous member having a packing density of 30% or less, wire gauze, unwoven metal fabric, punching metal or corrugated sheet having a filling rate not exceeding 30%. If a corrugated sheet is used, the volume of a rectangular space in which the sheet fits tightly is regarded as the volume of the sheet.

As shown in FIG. 10, the filters may be made of meshed fibers (FB) with numerous fine alumina whiskers 401 added thereto to form a multiplicity of minute pores.

FIG. 11 is an enlarged sectional view of the filters 1, 11 21. They may comprise a particulate trapping layer 301 made of a filter material, and a plurality of catalyst-carrying layers (such as layers 302 and 303).

The embodiments are described in more detail.

FIG. 12 shows an experiment device for evaluating the particulate trapping efficiency, the pressure drop when trapping particulates and the durability. This device comprises a 3400-cc, four-cylinder, direct-injection diesel engine car, a chassis dynamometer, and a dilution tunnel.

The device shown in FIG. 12 was also used to evaluate the purifying rates for NO and SOF, which we will describe later.

EXPERIMENT 1

The following three kinds of specimens were prepared.
A: filter element of FIG. 4 having the reinforcing members 2-1 inserted in the exhaust incoming spaces 4 of the filter element of FIG. 1 (Example of the invention)
B: filter element of FIG. 1 without reinforcing members (Comparative Example)
I: honeycomb filter element considered to have a sufficient particulate trapping capacity (made of cordierite, Japan Gaishi, PHC-221) (Comparative Example).

Table 1 shows more detailed data on these specimens. Specimen I has a volume of 2.5 liters, which is the same as Specimens A and B.

The reinforcing members used in Specimen A are formed by Ni—Cr—Al-alloying an Ni-based, three-dimensionally reticulated porous material (trade name: cermet #1) made by Sumitomo Electric Industries, Ltd.

Particulate traps 10 formed by placing these specimens in cases are mounted in the device shown in FIG. 12 to check how the filter elements were destroyed when high-temperature exhausts are passed for a long time. The results are shown in Table 3.

Specimens A and I were not destroyed. Specimen B was destroyed.

Next, we evaluated their durability during regeneration. After 15 g of particulates in diesel engine exhausts have been trapped, electric heaters provided so as to face all of the particulate trapping surfaces of the filters were tuned on to burn the trapped particulates, while keeping the engine idling so that exhaust gases at 600° C. are introduced into the trap. This regeneration test was conducted five times for each specimen, and then they were checked as to how they were destroyed. The results are shown in Table 4.

Specimens A and B were not destroyed, and specimen I suffered cracks. We also evaluated the particulate trapping capacity, and trapping properties such as increase in the pressure difference (pressure drop) after particulates are trapped. But no significant difference in these properties was observed among these three specimens.

From these experiment results, it is apparent that only the Embodiment A of the invention attained satisfactory results in all of the particulate trapping properties, durability and regeneration properties.

EXPERIMENT 2

The following Specimens C and D, and the Specimen I used in Experiment 1 were prepared.
C: filter element similar to the filter element of FIG. 1 (the positions of the dead ends of the spaces are partially varied) with the reinforcing members 2-1 inserted in the exhaust gas outgoing spaces 4 and the reinforcing members 2-2 provided at both ends so that it has the same sectional shape as shown in FIG. 6 (Example of the invention)
D: filter element which is the same as Specimen C except that it has no reinforcing members (Comparative Example)

Table 5 shows detailed data on these specimens. Table 6 shows the detailed data on the reinforcing members 2-1 and 2-2 used in Specimen C.

Table 7 shows the results of an endurance test conducted for each specimen in the same manner as in EXPERIMENT 1.

Particulates trapped were burned for regeneration under the same conditions as in EXPERIMENT 1 to evaluate the durability of each specimen during regeneration. The results are shown in Table 8.

As will be apparent from Tables 7 and 8, Specimen D was poor in durability, while Specimen I was poor in the results of the regeneration test. In contrast, the specimen according to the invention (Specimen C) was superior both in durability and regeneration properties. As for the particulate trapping properties, all of the specimens achieved good results. No significant difference was observed among the specimens.

EXPERIMENT 3

The following Specimens E and F and the abovementioned Specimen I were prepared.
E: filter element comprising, similar to the filter element of FIG. 2, concentrically arranged cylindrical filters having different diameters, with the reinforcing members 2-1 inserted in the exhaust gas outgoing spaces 4 and the reinforcing members 2-2 provided at both ends, so that the filter element has the same sectional shape as shown in FIG. 6 (Example of the invention)
F: filter element which is the same as Specimen E except that it has no reinforcing members (Comparative Example)

Table 9 shows detailed data on these specimens. Table 10 shows the detailed data on the reinforcing members 2-1 and 2-2 used in Specimen E.

Each specimen was subjected to the same endurance test and regeneration test as in EXPERIMENT 1. The test results are shown in Tables 11 and 12. As for the particulate trapping properties, no significant difference was observed among the three specimens.

The test results are exactly the same as the results in Embodiments 1 and 2. That is, only the example of the invention, i.e. Specimen E, achieved good results in all of the particulate trapping properties, durability and regenerating properties.

EXPERIMENT 4

The following Specimens G and H and the abovementioned Specimen I were prepared.
G: filter element shown in FIG. 3 with the reinforcing members 2-2 provided at both ends so that it has the sectional shape shown in FIG. 7 (Example of the invention)
H: filter element of FIG. 3 but with no reinforcing members (Comparative Example)

Tables 13 and 14 show more detailed data on these specimens and the reinforcing members 2-2 used in Specimen G.

Each specimen was subjected to the same endurance test and regeneration test as in EXPERIMENT 1. The test results are shown in Tables 15 and 16.

The test results are exactly the same as the results in EXPERIMENT 1, 2 and 3. As for the particulate trapping properties, no significant difference was observed among the specimens.

As will be apparent from the above EXPERIMENTS, the concept of the present invention is applicable to any of the filter elements shown in FIGS. 1, 2 and 3.

FIGS. 13 and 14 show specific embodiments of the filter element for use in the particulate trap claimed in claim 7.

The filter element 31 shown in FIG. 13 is an improved version of the filter element shown in FIG. 2. The filter element 41 shown in FIG. 14 is an improvement of the filter element shown in FIG. 3.

These filter elements 31 and 41 comprise a plurality of groups of concentrically arranged cylindrical filters, each group comprising several adjacent filters having the same thickness which is larger than the thicknesses of the smaller-diameter filters of the inner filter group. But it is more preferable that each cylindrical filter has a larger thickness than the inner, smaller-diameter filters.

We will describe embodiments of the filter elements shown in FIGS. 13 and 14 in more detail.

EXPERIMENT 5

The following three kinds of specimens were prepared.

J: filter elements comprising 11 cylindrical filters having different diameters and arranged concentrically with one another as shown in FIG. 13, the filters having thicknesses increasing outwardly in five stages (Example of the invention)

K: filter element comprising 11 concentrically arranged cylindrical filters having different diameters and the same thickness (Comparative Example)

I: filter elements used in EXPERIMENTS 1–4 (Comparative Example)

Table 17 shows detailed data on these specimens. Specimen I had a volume of 2.5 liters, which is the same volume as Specimens J and K.

For filter element specimens J and K, we determined by calculation the exhaust gas pressures that caused buckling of these filter elements. The results are shown in Table 18. FIG. 15 shows the relationship between the maximum stress applied to the cylindrical filter of each of Specimens J and K due to the initial exhaust pressure and the filter diameter.

For Specimen K, the stress increased in proportion to the filter diameter. For Specimen J, the maximum stresses applied to the outer, thicker filters were suppressed. They are considered to have larger resistance to buckling.

Particulate traps 10 formed by placing these specimens J, K and I in cases are mounted in the exhaust line of the device shown in FIG. 12 to check how the filter elements were destroyed when high-temperature exhausts were passed for a long time. The results are shown in Table 19.

Specimens J and I were not destroyed. Specimen K was destroyed.

Next, we evaluated their durability during regeneration. After 15 g of particulates in diesel engine exhausts have been trapped, electric heaters provided so as to face all of the particulate trapping surfaces of the filters were tuned on to burn the trapped particulates, while keeping the engine idling to introduce exhaust gases at 600° C. into the trap. This regeneration test was conducted five times for each specimen, and then they were checked how they were destroyed. The results are shown in Table 20.

Specimens J and K were not destroyed, but specimen I suffered cracks. We also evaluated the particulate trapping capacity, and trapping properties such as increase in the pressure difference (pressure drop) due to trapping of particulates. But no significant difference in these properties was observed among these three specimens.

EXPERIMENT 6

The following Specimens L and M and the same Specimen I used in EXPERIMENT 5 were prepared.

L: filter element comprising eight tapered cylindrical filters having different diameters and arranged alternately in opposite directions to each other as shown in FIG. 14, the filters having thicknesses increasing outwardly in three steps (Example of the invention)

M: filter element comprising eight tapered cylindrical filters arranged in similar manner to Specimen L and having different diameters and the same thickness (Comparative Example)

Table 21 shows more detailed data on each specimen.

Table 22 shows the pressures at which Specimens L and M buckled. FIG. 16 shows the relationship between the maximum stress applied to each filter of the specimen due to the initial exhaust pressure and the filter diameter. Tables 23 and 24, respectively, show the results of an endurance test conducted in the same manner as in EXPERIMENT 5, and an endurance test during regeneration conducted in the same manner as in Embodiment 1, for Specimens L, M and I.

The test results are the same as in EXPERIMENT 5. For particulate trapping properties, no significant difference was observed among the specimens.

EXPERIMENT 7

The following four kinds of specimens were prepared. N, O: filter elements as shown FIG. 1 with the reinforcing members 2-1 inserted in the exhaust gas incoming spaces 4 as shown in FIG. 4 (Example of the invention)

P: filter element as shown in FIG. 1 without reinforcing members (Comparative Example)

I: honeycomb filter element considered to have a sufficient particulate trapping capacity (made of cordierite, by NIHON GAISHI, PHC-221) (Comparative Example).

Table 25 shows detailed data on these specimens. Specimen I has a volume of 2.5 liters, i.e. the same volume as Specimens N, 0 and P.

The reinforcing members used in Specimens N and O are formed by Ni—Cr—Al-alloying an Ni-based. three-dimensionally reticulated porous material (trade name: cermet #1) made by Sumitomo Electric Industries, Ltd.

The filter element 1 of Specimen N comprises a NOx catalyst-carrying layer (302 in FIG. 11), a particulate trapping layer (301 in FIG. 11), and a NOx catalyst-carrying layer (303 in FIG. 11). Each NOx catalyst layer comprises a substrate of Fe—Cr—Al unwoven metal fabric, a catalyst-carrying a $\gamma$-alumina coating provided on the unwoven metal fabric at the rate of 100 grams per liter of unwoven metal fabric, and Cu as a catalyst uniformly carried on the $\gamma$-alumina coating at the rate of 1.0 gram per liter of unwoven metal fabric.

The reinforcing members (2-1 in FIG. 4) of Specimen O has a NOx catalyst-carrying a $\gamma$-alumina coating on the cermet substrate at the rate of 100 grams per liter of cermet, and Cu as a catalyst uniformly carried on the $\gamma$-alumina coating at the rate of 1.0 gram/liter.

Each specimen was subjected to the same endurance test and regeneration test as in EXPERIMENT 1. The test results are shown in Tables 27 and 28. There was no difference in the particulate trapping properties among the specimens.

Specimens N and O achieved satisfactory results in all of the particulate trapping properties, durability and regenerating properties.

For Specimens N and O, we evaluated their NO purifying rates.

In this test, $C_2H_4$ was introduced into exhausts as a reducing agent. The contents of the exhausts are shown in Table 29.

For each specimen, the NO concentration was measured for two minutes while keeping the exhaust temperature at 250° C. Table 30 shows the average NO concentration.

From these tables, it is apparent that the NO concentration decreased to half by passing exhaust through Specimen N or O.

From these experiment results, it is apparent that only the Specimens N and O according to the present invention can achieve satisfactory results in all of the particulate trapping properties, durability and regenerating properties. Moreover, these specimens can reduce the NO content in exhausts, so that there is no need to provide a catalytic converter. Thus, by using the particulate trap according to the present invention, it is possible to reduce the installation space and the manufacturing cost of the diesel exhaust after-treatment device.

EXPERIMENT 8

The following four kinds of specimens were prepared:

Q, R: filter elements comprising, similar to the filter element of FIG. 2, concentrically arranged cylindrical filters having different diameters, with the reinforcing members 2-1 inserted in the exhaust gas outgoing spaces 4 and the reinforcing members 2-2 provided at both ends, so that the filter element has the same sectional shape shown in FIG. 6 (Example of the invention);

S: filter element which is the same as Specimen Q and R except that it has no reinforcing members (Comparative Example);

I: honeycomb filter element considered to have a sufficient particulate trapping capacity (made of cordierite, by NIHON GAISHI, PHC-221) (Comparative Example).

Table 31 shows detailed data on these specimens. Table 32 shows the details for the reinforcing members 2-1, 2-2 used for Specimens Q and R. Specimen I has a volume of 2.5 liters, i.e. the same volume as Specimens Q, R and S.

The filter element 11 of Specimen Q comprises an SOF catalyst-carrying layer (302 in FIG. 11), a particulate trapping layer (301 in FIG. 11), and another SOF catalyst-carrying layer (303 in FIG. 11). Each SOF catalyst layer comprises a substrate of Fe—Cr—Al unwoven metal fabric, a catalyst-carrying γ-alumina coating provided on the unwoven metal fabric at the rate of 150 grams per liter of unwoven metal fabric, and Pt as a catalyst uniformly carried on the γ-alumina coating at the rate of 1.5 grams/liter.

The reinforcing members (2-1 in FIG. 6) of Specimen R has an SOF catalyst-carrying γ-alumina coating on the cermet substrate at the rate of 150 grams per liter of cermet, and Pt as a catalyst uniformly carried on the γ-alumina coating at the rate of 1.5 grams/liter.

Each specimen was subjected to the same endurance test and regeneration test as in EXPERIMENT 1. The test results are shown in Tables 33 and 34. There was no difference in the particulate trapping properties among the three specimens.

Specimens Q and R according to the invention achieved satisfactory results in all of the particulate trapping properties, durability and regenerating properties.

For Specimens Q and R, we evaluated their SOF purifying rates.

This test was conducted while keeping the exhaust gas temperature at 250° C. and 350° C. The test results are shown in Table 35.

By passing exhausts through Specimens Q and R carrying Pt as a catalyst, the SOF concentration decreased by 40% or 50%.

From these experiment results, it is apparent that only the Specimens Q and R according to the present invention can achieve satisfactory results in all of the particulate trapping properties, durability and regerating properties. Moreover, these specimens also can reduce the SOF content in exhausts, so that there is no need to provide a catalytic converter. Thus, by using the particulate trap according to the present invention, it is possible to reduce the installation space and the manufacturing cost of the diesel exhaust after-treatment device.

EXPERIMENT 9

The following four kinds of specimens were prepared:

T, U: filter elements comprising, similar to the filter element of FIG. 2, concentrically arranged cylindrical filters having different diameters, with the reinforcing members 2-3 and 2-1 inserted, respectively, in the exhaust incoming spaces 3 and exhaust outgoing spaces 4 and the reinforcing members 2-2 provided at both ends, so that the filter element has the same sectional shape shown in FIG. 8 (Example of the invention);

V: filter element which is the same as Specimen T and U except that it has no reinforcing members (Comparative Example)

I: honeycomb filter element considered to have a sufficient particulate trapping capacity (made of cordierite, by NIHON GAISHI, PHC-221) (Comparative Example).

Table 36 shows detailed data on these specimens. Table 37 shows detailed data on the reinforcing members 2-1, 2-2 and 2-3 used in Specimens T and U. Specimen I has a volume of 2.5 liters, i.e. the same volume as Specimens T, U and V.

The reinforcing members (2-1 and 2-3 in FIG. 8) of Specimen T has a NOx catalyst-carrying γ-alumina coating on the cermet substrate at the rate of 100 grams per liter of cermet, and Cu as a catalyst uniformly carried on the γ-alumina coating at the rate of 1.0 grams/liter.

The reinforcing members (2-1 and 2-3 in FIG. 8) of Specimen U has an SOF catalyst-carrying γ-alumina coating on the unwoven metal fabric substrate at the rate of 150 grams per liter of unwoven fabric, and Pt as a catalyst uniformly carried on the γ-alumina coating at the rate of 1.5 grams/liter.

Each specimen was subjected to the same endurance test and regeneration test as in EXPERIMENT 1. The test results are shown in Tables 38 and 39. There was no difference in the particulate trapping properties among the three specimens.

Specimens T and U according to the invention achieved satisfactory results in all of the particulate trapping properties, durability and regenerating properties.

For Specimen T, its NO purifying rate was measured.

In this test, $C_2H_4$ was introduced into exhaust gas as a reducing agent. The content of the exhaust gas is shown in Table 40.

The NO concentration was measured for two minutes while keeping the exhaust temperature at 250° C. Table 41 shows the average concentration.

From these tables, it is apparent that the NO concentration decreased to half by passing exhausts through Specimen T.

For Specimen U, its SOF purifying rate was measured.

This test was conducted while keeping the exhaust gas temperature at 250° C. and 350° C. The test results are shown in Table 42.

By passing exhausts through Specimen U carrying Pt as a catalyst, the SOF concentration decreased by 40% or 50%.

From these experiment results, it is apparent that only the Specimens T and U according to the present invention can achieve satisfactory results in all of the particulate trapping properties, durability and regerminative properties. Moreover, these specimens can reduce the NOx content (Specimen T) or the SOF content (Specimen U) in exhausts, so that there is no need to provide a catalytic converter. Thus, by using the particulate trap according to the present invention, it is possible to reduce the installation space and the manufacturing cost of the diesel exhaust after-treatment device.

TABLE 1

| | Filter element | | | | |
|---|---|---|---|---|---|
| | Material | Material | Thickness | Packing density | Filter area |
| Specimen A (Invented) | Unwoven metal fabrics (fiber 20 μm dia) | Fe—Cr—Al | 0.5 mm | 20% | 1.3 m$^2$ |
| Specimen B (Invented) | Unwoven metal fabrics (fiber 20 μm dia) | Fe—Cr—Al | 0.5 mm | 20% | 1.3 m$^2$ |
| Specimen I (Comparative) | Cordierite | MgO—Al$_2$O$_3$—SiO$_2$ | 0.5 mm | 50% | 2.3 m$^2$ |

TABLE 2

| | Material | Material | Packing density | Heat resistance | Strength |
|---|---|---|---|---|---|
| Reinforcing member of Specimen A | cermet[#1] | Ni—Cr—Al | 5% | No deterioration when exposed to exhaust at 700° C. for 100 hours | No breakage under pressure of 0.3 kg/cm$^2$ by exhaust at 700° C. |

[#1] is model number, which indicates that the number of cells is 6–11 per unit length (1 inch).

TABLE 3

| Specimen | Results of endurance test (Temperature of exhaust at trap inlet: 700° C.) |
|---|---|
| Specimen A | No breakage after 150 hours |
| Specimen B | Breakage noticed after 120 hours |
| Specimen C | No breakage after 150 hours |

TABLE 4

| | Regeneration test result |
|---|---|
| Specimen A (Invented) | Not broken |
| Specimen B (Comparative) | Not broken |
| Specimen I (Comparative) | Crack formed |

TABLE 5

| | Filter element | | | | |
|---|---|---|---|---|---|
| | Material | Material | Thickness | Packing density | Filter area |
| Specimen C (Invented) | Unwoven metal fabrics (fiber 20 μm dia) | Fe—Cr—Al | 0.5 mm | 20% | 1.3 m$^2$ |
| Specimen D (Comparative) | Unwoven metal fabrics (fiber 20 μm dia) | Fe—Cr—Al | 0.5 mm | 20% | 1.3 m$^2$ |
| Specimen I (Comparative) | Cordierite | MgO—Al$_2$O$_3$—SiO$_2$ | 0.5 mm | 50% | 2.3 m$^2$ |

TABLE 6

| | Material | Material | Packing density | Heat resistance | Strength |
|---|---|---|---|---|---|
| Reinforcing member 2-1 | wire gauge | Fe—Cr—Al | 20% | No deterioration when exposed to exhaust at 700° C. for 100 hours | No breakage under pressure of 0.3 kg/cm² by exhaust at 700° C. |
| Reinforcing member 2-2 | cermet[#2] | Ni—Cr—Al | 5% | No deterioration when exposed to exhaust at 700° C. for 100 hours | No breakage under pressure of 0.3 kg/cm² by exhaust at 700° C. |

[#2] is model number, which indicates that the number of cells is 11–17 per unit length (1 inch).

TABLE 7

| Specimen | Results of endurance test (Temperature of exhaust at trap inlet: 800° C.) |
|---|---|
| Specimen C | No breakage after 120 hours |
| Specimen D | Breakage noticed after 100 hours |
| Specimen I | No breakage after 120 hours |

TABLE 8

| | Regeneration test result |
|---|---|
| Specimen C (Invented) | Not broken |
| Specimen D (Comparative) | Not broken |
| Specimen I (Comparative) | Crack formed |

TABLE 11

| Specimen | Results of endurance test (Temperature of exhaust at trap inlet: 800° C.) |
|---|---|
| Specimen E | No breakage after 120 hours |
| Specimen F | Breakage noticed after 100 hours |
| Specimen I | No breakage after 120 hours |

TABLE 12

| | Regeneration test result |
|---|---|
| Specimen E (Invented) | Not broken |
| Specimen F (Comparative) | Not broken |
| Specimen I (Comparative) | Crack formed |

TABLE 9

| | Filter element | | | | |
|---|---|---|---|---|---|
| | Material | Material | Thickness | Packing density | Filter area |
| Specimen E (Invented) | Unwoven metal fabrics (fiber 20 μm dia) | Fe—Cr—Al | 0.5 mm | 20% | 1.3 m² |
| Specimen F (Comparative) | Unwoven metal fabrics (fiber 20 μm dia) | Fe—Cr—Al | 0.5 mm | 20% | 1.3 m² |
| Specimen I (Comparative) | Cordierite | MgO—Al₂O₃—SiO₂ | 0.5 mm | 50% | 2.3 m² |

TABLE 10

| | Material | Material | Packing density | Heat resistance | Strength |
|---|---|---|---|---|---|
| Reinforcing member 2-1 | cement[#2] gauge | Ni—Cr—Al | 5% | No deterioration when exposed to exhaust at 700° C. for 100 hours | No breakage under presssure of 0.3 kg/cm² by exhaust at 700° C. |
| Reinforcing member 2-2 | punching metal | Fe—Cr—Al | 15% | No deterioration when exposed to exhaust at 700° C. for 100 hours | No breakage under pressure of 0.3 kg/cm² by exhaust at 700° C. |

TABLE 13

| | Filter element | | | | |
|---|---|---|---|---|---|
| | Material | Material | Thickness | Packing density | Filter area |
| Specimen G (Invented) | Unwoven metal fabrics (fiber dia 40 μm at inlet 20 μm at outlet) | Fe—Cr—Al | 0.5 mm | 20% | 1.3 m$^2$ |
| Specimen H (Comparative) | Unwoven metal fabrics (fiber dia 40 μm at inlet 20 μm at outlet) | Fe—Cr—Al | 0.5 mm | 20% | 1.1 m$^2$ |
| Specimen I (Comparative) | Cordierite | MgO—Al$_2$O$_3$—SiO$_2$ | 0.5 mm | 50% | 2.3 m$^2$ |

TABLE 14

| | Material | Material | Packing density | Heat resistance | Strength |
|---|---|---|---|---|---|
| Reinforcing member of Specimen A | cement [#1] | Ni—Cr—Al | 5% | No deterioration when exposed to exhaust at 700° C. for 100 hours | No breakage under pressure of 0.3 kg/cm$^2$ by exhaust at 700° C. |

TABLE 15

| Specimen | Results of endurance test (Temperature of exhaust at trap inlet: 700° C.) |
|---|---|
| Specimen G | No breakage after 150 hours |
| Specimen H | Breakage noticed after 120 hours |
| Specimen I | No breakage after 150 hours |

TABLE 16

| | Regeneration test result |
|---|---|
| Specimen G (Invented) | Not broken |
| Specimen H (Comparative) | Not broken |
| Specimen I (Comparative) | Crack formed |

TABLE 17

| | | Filter element | | | | | |
|---|---|---|---|---|---|---|---|
| | | Material | Material | Thickness | Packing density | Filter element used | Filter area |
| Specimen J (Invented) | | Unwoven metal fabrics (1) (fiber dia 50 μm at inlet 35 μm at outlet) | Fe—Cr—Al | 0.4 mm | 20% | cylindrical 10 and 15 mm radius | 1.1 m$^2$ |
| | | Unwoven metal fabrics (2) (fiber dia 35 μm at inlet 25 μm at outlet) | Fe—Cr—Al | 0.6 mm | 20% | cylindrical 20 and 25 mm radius | |
| | | Unwoven metal fabrics (3) (fiber dia 25 μm at inlet 20 μm at outlet) | Fe—Cr—Al | 0.8 mm | 20% | cylindrical 30 and 35 mm radius | |
| | | Unwoven metal fabrics (4) (fiber dia 20 μm at inlet 15 μm at outlet) | Fe—Cr—Al | 1.0 mm | 20% | cylindrical 40 and 45 mm radius | |
| | | Unwoven metal fabrics (5) (fiber dia 15 μm at inlet 10 μm at outlet) | Fe—Cr—Al | 1.2 mm | 20% | cylindrical 50, 55 and 60 mm radius | |
| Specimen K (Comparative) | | Unwoven metal fabrics (6) (fiber dia 40 μm at inlet 30 μm at outlet) | Fe—Cr—Al | 0.5 mm | 20% | all filter elements | 1.1 m$^2$ |
| Specimen I (Comparative) | | Cordierite | MgO—Al$_2$O$_3$—SiO$_2$ | 0.5 mm | 50% | all filter elements | 2.3 m$^2$ |

TABLE 18

| | Pressure at which buckling occured (in KPa) |
|---|---|
| Specimen J (Invented) | 200 |
| Specimen K (Comparative) | 40 |

TABLE 19

| Specimen | Results of endurance test (Temperature of exhaust at trap inlet: 800° C.) |
|---|---|
| Specimen J | No breakage after 150 hours |
| Specimen K | Breakage noticed after 100 hours |
| Specimen I | No breakage after 150 hours |

TABLE 20

| | Regeneration test result |
|---|---|
| Specimen J (Invented) | Not broken |
| Specimen K (Comparative) | Not broken |
| Specimen I (Comparative) | Crack formed |

TABLE 21

| | Material | Filter element Material | Thickness | Packing density | Filter element used | Filter area |
|---|---|---|---|---|---|---|
| Specimen L (Invented) | Unwoven metal fabrics (1) (fiber dia 40 μm at inlet 30 μm at outlet) | Fe—Cr—Al | 0.5 mm | 20% | tapered elements 1) 0 × 20 mm radius 2) 20 × 30 mm radius | 1.2 m² |
| | Unwoven metal fabrics (2) (fiber dia 20 μm at inlet 15 μm at outlet) | Fe—Cr—Al | 1.0 mm | 20% | tapered elements 1) 30 × 40 mm radius 2) 40 × 50 mm radius 3) 50 × 50 mm radius | |
| | Unwoven metal fabrics (3) (fiber dia 15 μm at inlet 10 μm at outlet) | Fe—Cr—Al | 1.5 mm | 20% | tapered elements 1) 60 × 70 mm radius 2) 70 × 80 mm radius 3) 80 × 90 mm radius | |
| Specimen M (Comparative) | Unwoven metal fabrics (1) (fiber dia 40 μm at inlet 20 μm at outlet) | Fe—Cr—Al | 0.5 mm | 20% | all filter elements | 1.1 m² |
| Specimen I (Comparative) | Cordierite | MgO—Al₂O₃—SiO₂ | 0.5 mm | 50% | all filter elements | 2.3 m² |

TABLE 22

| | Pressure at which buckling occured (in KPa) |
|---|---|
| Specimen L (Invented) | 140 |
| Specimen M (Comparative) | 15 |

TABLE 23

| Specimen | Results of endurance test (Temperature of exhaust at trap inlet: 800° C.) |
|---|---|
| Specimen L | No breakage after 120 hours |
| Specimen M | Breakage noticed after 100 hours |
| Specimen I | No breakage after 120 hours |

TABLE 24

| | Regeneration test result |
|---|---|
| Specimen L (Invented) | Not broken |
| Specimen M (Comparative) | Not broken |
| Specimen I (Comparative) | Crack formed |

TABLE 25

| | Filter element | | | | |
|---|---|---|---|---|---|
| | Material | Material | Thickness | Packing density | Filter area |
| Specimen N (Invented) | (1) Unwoven metal fabrics (fiber dia 100 μm) + γ-Al₂O₃ + Cu | (1) Fe—Cr—Al + γ-Al₂O₃ + Cu | 1.0 mm | 20% | 1.3 m² |
| | (2) Unwoven metal fabrics (fiber dia 20 μm) | (2) Fe—Cr—Al | | | |
| | (3) Unwoven metal fabrics (fiber dia 100 μm) + γ-Al₂O₃ + Cu | (3) Fe—Cr—Al + γ-Al₂O₃ + Cu | | | |
| Specimen O (Invented) | Unwoven metal fabrics (fiber dia 20 μm) | Fe—Cr—Al | 1.0 mm | 20% | 1.3 m² |
| Specimen P (Comparative) | Unwoven metal fabrics (fiber dia 20 μm) | Fe—Cr—Al | 1.0 mm | 20% | 1.3 m² |
| Specimen I (Comparative) | Cordierite | MgO—Al₂O₃—SiO₂ | 1.0 mm | 50% | 2.3 m² |

TABLE 26

| | Material | Material | Packing density | Heat resistance | Strength |
|---|---|---|---|---|---|
| Reinforcing member of Specimen N | cement #1 | Ni—Cr—Al | 5% | No deterioration when exposed to exhaust at 700° C. for 100 hours | No breakage under pressure of 0.3 kg/cm² by exhaust at 700° C. |
| Reinforcing member of Specimen O | cement #1 | Ni—Cr—Al + γ-Al₂O₃ + Cu | 5% | No deterioration when exposed to exhaust at 700° C. for 100 hours | No breakage under pressure of 0.3 kg/cm² by exhaust at 700° C. |

1 is model number, which indicates that the number of cells is 6–11 per unit length (1 inch).

TABLE 27

| Specimen | Results of endurance test (Temperature of exhaust at trap inlet: 700° C.) |
|---|---|
| Specimen N | No breakage after 150 hours |
| Specimen O | No breakage after 150 hours |
| Specimen F | Breakage noticed after 120 hours |
| Specimen I | No breakage after 150 hours |

TABLE 28

| | Regeneration test result |
|---|---|
| Specimen N | Not broken |
| Specimen O | Not broken |
| Specimen P | Not broken |
| Specimen I | Crack formed |

TABLE 29

| Item | Condition |
|---|---|
| NO concentration in exhausts | 1000 ppm |
| C₂H₄ concentration in exhausts | 250 ppm |
| O₂ concentration in exhausts | 2% |
| Exhaust temperature | 250° C. |

TABLE 30

| | NO concentration |
|---|---|
| Specimen N | 500 ppm |
| Specimen O | 500 ppm |

TABLE 31

| | Filter element | | | | |
|---|---|---|---|---|---|
| | Material | Material | Thickness | Packing density | Filter area |
| Specimen Q (Invented) | (1) Unwoven metal fabrics (fiber dia 100 μm) + γ-Al₂O₃ + Cu<br>(2) Unwoven metal fabrics (fiber dia 20 μm)<br>(3) Unwoven metal fabrics (fiber dia 100 μm) + γ-Al₂O₃ + Cu | (1) Fe—Cr—Al + γ-Al₂O₃ + Pt<br>(2) Fe—Cr—Al<br>(3) Fe—Cr—Al + γ-Al₂O₃ + Pt | 1.0 mm | 20% | 1.3 m² |
| Specimen R (Invented) | Unwoven metal fabrics (fiber dia 20 μm) | Fe—Cr—Al | 1.0 mm | 20% | 1.3 m² |
| Specimen S (Comparative) | Unwoven metal fabrics (fiber dia 20 μm) | Fe—Cr—Al | 1.0 mm | 20% | 1.3 m² |
| Specimen I (Comparative) | Cordierite | MgO—Al₂O₃—SiO₂ | 1.0 mm | 50% | 2.3 m² |

TABLE 32

| | Material | Material | Packing density | Heat resistance | Strength |
|---|---|---|---|---|---|
| Reinforcing member 2-1 of Specimen Q | wire gauge | Fe—Cr—Al | 20% | No deterioration when exposed to exhaust at 700° C. for 100 hours | No breakage under pressure of 0.3 kg/cm² by exhaust at 700° C. |
| Reinforcing member 2-2 of Specimen Q | cement [#2] | Ni—Cr—Al | 5% | No deterioration when exposed to exhaust at 700° C. for 100 hours | No breakage under pressure of 0.3 kg/cm² by exhaust at 700° C. |
| Reinforcing member 2-1 of Specimen R | wire gauge | Fe—Cr—Al | 20% | No deterioration when exposed to exhaust at 700° C. for 100 hours | No breakage under pressure of 0.3 kg/cm² by exhaust at 700° C. |
| Reinforcing member 2-2 of Specimen R | cement [#2] | Ni—Cr—Al + γ-Al₂O₃ + Pt | 5% | No deterioration when exposed to exhaust at 700° C. for 100 hours | No breakage under pressure of 0.3 kg/cm² by exhaust at 700° C. |

[#2] is model number, which indicates that the number of cells is 11–17 per unit length (1 inch).

TABLE 33

| Specimen | Results of endurance test (Temperature of exhaust at trap inlet: 800° C.) |
|---|---|
| Specimen Q | No breakage after 150 hours |
| Specimen R | No breakage after 150 hours |
| Specimen S | Breakage noticed after 120 hours |
| Specimen I | No breakage after 150 hours |

TABLE 34

| | Regeneration test result |
|---|---|
| Specimen Q | Not broken |
| Specimen R | Not broken |
| Specimen S | Not broken |
| Specimen I | Crack formed |

TABLE 35

| | SOF removing rate (%) | |
|---|---|---|
| | Exhaust temperature 250° C. | Exhaust temperature 350° C. |
| Specimen Q | 40 | 50 |
| Specimen R | 40 | 50 |

TABLE 36

| | Filter element | | | | |
|---|---|---|---|---|---|
| | Material | Material | Thickness | Packing density | Filter area |
| Specimen T (Invented) | Unwoven metal fabrics (fiber 20 μm dia) | Fe—Cr—Al | 0.5 mm | 20% | 1.3 m$^2$ |
| Specimen U (Invented) | Unwoven metal fabrics (fiber 20 μm dia) | Fe—Cr—Al | 0.5 mm | 20% | 1.3 m$^2$ |
| Specimen V (Comparative) | Unwoven metal fabrics (fiber 20 μm dia) | Fe—Cr—Al | 0.5 mm | 20% | 1.3 m$^2$ |
| Specimen I (Comparative) | Cordierite | MgO—Al$_2$O$_3$—SiO$_2$ | 0.5 mm | 50% | 2.3 m$^2$ |

TABLE 37

| | Material | Material | Packing density | Heat resistance | Strength |
|---|---|---|---|---|---|
| Reinforcing member 2-1, 2-3 of Specimen T | cement #2 | Fe—Cr—Al + γ-Al$_2$O$_3$ + Cu | 5% | No deterioration when exposed to exhaust at 700° C. for 100 hours | No breakage under pressure of 0.3 kg/cm$^2$ by exhaust at 700° C. |
| Reinforcing member 2-1, 2-3 of Specimen U | cement #2 | Ni—Cr—Al + γ-Al$_2$O$_3$ + Pt | 5% | No deterioration when exposed to exhaust at 700° C. for 100 hours | No breakage under pressure of 0.3 kg/cm$^2$ by exhaust at 700° C. |

2 is model number, which indicates that the number of cells is 11–17 per unit length (1 inch).

TABLE 38

| Specimen | Results of endurance test (Temperature of exhaust at trap inlet: 700° C.) |
|---|---|
| Specimen T | No breakage after 150 hours |
| Specimen U | No breakage after 150 hours |
| Specimen V | Breakage noticed after 120 hours |
| Specimen I | No breakage after 150 hours |

TABLE 39

| | Regeneration test result |
|---|---|
| Specimen T | Not broken |
| Specimen U | Not broken |
| Specimen V | Not broken |
| Specimen I | Crack formed |

TABLE 40

| Item | Condition |
|---|---|
| NO concentration in exhausts | 1000 ppm |
| C$_2$H$_4$ concentration in exhausts | 250 ppm |
| O$_2$ concentration in exhausts | 2% |
| Exhaust temperature | 250° C. |

TABLE 41

| | NO concentration |
|---|---|
| Specimen T | 500 ppm |

TABLE 42

| | SOF removing rate (%) | |
|---|---|---|
| | Exhaust temperature 250° C. | Exhaust temperature 350° C. |
| Specimen U | 40 | 50 |

What is claimed is:

1. A particulate trap for a diesel engine, comprising:

a filter element comprising a plurality of parallel flat filters having spaces therebetween, said spaces having inlet and outlet ends at ends of said filters and two sides, end plates that alternately close said inlet and outlet ends of said spaces between adjacent ones of said filters, and liners closing both sides of said spaces, wherein alternating exhaust incoming spaces and exhaust outgoing spaces of said filter element are defined;

wherein said filters are made of unwoven fabrics of metal fibers; and filter reinforcing members that are permeable to exhaust gases provided in a location selected from a group of locations consisting of a) in each of said exhaust outgoing spaces and covering filtering surfaces of said filters, b) at both ends of said filters positioned so as to extend across the entire section of said filter element and thus across the ends of all of said filters of said filter element, and c) in each of said exhaust outgoing spaces and covering filtering surfaces of said filters and at both ends of said filters positioned so as to extend across the entire section of said filter element and thus across the ends of all of said filters of said filter element, said filter reinforcing members having a packing density of 5–30% and being made of metal.

2. The particulate trap of claim 1, wherein said reinforcing members are:

made of a heat-resistant metal comprising Cr or Al and one of Fe, Ni and Co; and have a form selected from the group consisting of a three-dimensionally reticulated porous member, wire gauze, metal fiber unwoven fabric, corrugated sheet and punched sheet.

3. The particulate trap of claim 1, wherein said filter element has an exhaust inlet side and an exhaust outlet side, wherein each of said filters is made of at least two different portions having different pore diameters and fiber diameters, and wherein one of said at least two different filter materials having a greater pore diameter and greater fiber diameter than another of said at least two different portions is provided nearer to said exhaust inlet side.

4. The particulate trap of claim 1, wherein exhaust inlets and exhaust outlets are defined between said filters so as to have a width that does not exceed 10 mm.

5. The particulate trap of claim 1, wherein each of said filters has a catalyst carried on at least one side thereof.

6. The particulate trap of claim 5, wherein each of said filters has a catalyst carried on both sides thereof.

7. The particulate trap of claim 1, wherein each of said filters has a three-dimensionally reticulated porous member carrying a catalyst provided on at least one side thereof.

8. The particulate trap of claim 7, wherein each of said filters has a three-dimensionally reticulated porous member carrying a catalyst provided on both sides thereof.

9. The particulate trap of claim 1, wherein said filters have alumina whiskers thereon.

10. A particulate trap for a diesel engine, comprising:

a filter element comprising a plurality of untapered cylindrical filters having similar sections with different cylindrical diameters and arranged concentrically with each other, said filters having spaces between each other and inlet and outlet ends of said spaces at ends of said filters, and end plates alternately closing said exhaust incoming spaces and said exhaust outgoing spaces;

wherein said filters are made of unwoven fabrics of metal fibers; and filter reinforcing members that are permeable to exhaust gases provided in a location selected from a group of locations consisting of a) in each of said exhaust outgoing spaces, b) at both ends of said filters positioned so as to extend across the entire section of said filter element and thus across the ends of all of said filters of said filter element, and c) in each of said exhaust outgoing spaces and at both ends of said filters positioned so as to extend across the entire section of said filter element and thus across the ends of all of said filters of said filter element, said filter reinforcing members having a packing density of 5–30% and being made of metal.

11. The particulate trap of claim 10, wherein said reinforcing members are:

made of a heat-resistant metal comprising Cr or Al and one of Fe, Ni and Co; and have a form selected from the group consisting of a three-dimensionally reticulated porous member, wire gauze, metal fiber unwoven fabric, corrugated sheet and punched sheet.

12. The particulate trap of claim 10, wherein said filter element has an exhaust inlet side and an exhaust outlet side, wherein each of said filters is made of at least two different portions having different pore diameters and fiber diameters, and wherein one of said at least two different filter materials having a greater pore diameter and greater fiber diameter than another of said at least two different portions is provided nearer to said exhaust inlet side.

13. The particulate trap of claim 10, wherein exhaust inlets and exhaust outlets are defined between said filters so as to have a width that does not exceed 10 mm.

14. The particulate trap of claim 10, wherein each of said filters has a catalyst carried on at least one side thereof.

15. The particulate trap of claim 14, wherein each of said filters has a catalyst carried on both sides thereof.

16. The particulate trap of claim 10, wherein each of said filters has a three-dimensionally reticulated porous member carrying a catalyst provided on at least one side thereof.

17. The particulate trap of claim 16, wherein each of said filters has a three-dimensionally reticulated porous member carrying a catalyst provided on both sides thereof.

18. The particulate trap of claim 10, wherein said filters have alumina whiskers thereon.

19. A particulate trap for a diesel engine, comprising:

a filter element comprising a plurality of tapered conical filters that each taper from one end toward an other end and that have different average conical diameters from one another and are arranged concentrically, adjacent ones of said filters tapering in opposite directions and adjacent ones of said filters being connected together such that the one end of one filter is connected to the other end of another filter for each adjacent pair of said filters so as to define alternating exhaust incoming spaces and exhaust outgoing spaces;

wherein said filters are made of unwoven fabrics of metal fibers; and filter reinforcing members that are permeable to exhaust gases provided in a location selected from a group of locations consisting of a) in each of said exhaust outgoing spaces, b) at both ends of said filters positioned so as to extend across the entire section of said filter element and thus across the ends of all of said filters of said filter element, and c) in each of said exhaust outgoing spaces and at both ends of said filters positioned so as to extend across the entire section of said filter element and thus across the ends of all of said filters of said filter element, said filter reinforcing members having a packing density of 5–30% and being made of metal.

20. The particulate trap of claim 19, wherein said reinforcing members are:

made of a heat-resistant metal comprising Cr or Al and one of Fe, Ni and Co; and have a form selected from the group consisting of a three-dimensionally reticulated porous member, wire gauze, metal fiber unwoven fabric, corrugated sheet and punched sheet.

21. The particulate trap of claim 19, wherein said filter element has an exhaust inlet side and an exhaust outlet side, wherein each of said filters is made of at least two different portions having different pore diameters and fiber diameters, and wherein one of said at least two different filter materials having a greater pore diameter and greater fiber diameter than another of said at least two different portions is provided nearer to said exhaust inlet side.

22. The particulate trap of claim 19, wherein exhaust inlets and exhaust outlets are defined between said filters so as to have a width that does not exceed 10 mm.

23. The particulate trap of claim 19, wherein each of said filters has a catalyst carried on at least one side thereof.

24. The particulate trap of claim 23, wherein each of said filters has a catalyst carried on both sides thereof.

25. The particulate trap of claim 19, wherein each of said filters has a three-dimensionally reticulated porous member carrying a catalyst provided on at least one side thereof.

26. The particulate trap of claim 25, wherein each of said filters has a three-dimensionally reticulated porous member carrying a catalyst provided on both sides thereof.

27. The particulate trap of claim 19, wherein said filters have alumina whiskers thereon.

28. A particulate trap for a diesel engine, comprising:

a filter element comprising one of a plurality of untapered cylindrical filters and a plurality of tapered filters, said filters being made of unwoven fabrics of metal fibers, said filters having different diameters from one another, said filters being arranged concentrically so as to define alternating, longitudinally extending, concentric exhaust incoming spaces and exhaust outgoing spaces between adjacent said filters and inside the one of said filters having the smallest diameter, wherein said exhaust incoming spaces have closed outlet ends, and wherein said exhaust outgoing spaces have closed inlet ends; and a container for provision in an exhaust line of a diesel engine, said filter element being disposed in said container;

wherein one of said filters having a larger diameter than another of said filters also is thicker than the other of said filters.

29. The particulate trap of claim 28, wherein said filters comprise a first group of filters having large diameters and a second group of filters having smaller diameters, said first group of filters having a larger thickness than said second group of filters.

30. The particulate trap of claim 29, wherein said filters comprises a first group of filters having a larger diameter and a second group of filters having a smaller diameter, said first group of filters being thicker than said second group.

31. The particulate trap of claim 30, wherein said filters of said first group all have the same thickness and said filters of said second group all have the same thickness.

32. The particulate trap of claim 28, wherein said filter element has an exhaust inlet side and an exhaust outlet side, wherein each of said filters is made of at least two different portions having different pore diameters and fiber diameters, and wherein one of said at least two different filter materials having a greater pore diameter and greater fiber diameter than another of said at least two different portions is provided nearer to said exhaust inlet side.

33. The particulate trap of claim 29, wherein exhaust inlets and exhaust outlets are defined between said filters so as to have a width that does not exceed 10 mm.

34. The particulate trap of claim 29, wherein each of said filters has a catalyst carried on at least one side thereof.

35. The particulate trap of claim 34, wherein each of said filters has a catalyst carried on both sides thereof.

36. The particulate trap of claim 28, wherein each of said filters has a three-dimensionally reticulated porous member carrying a catalyst provided on at least one side thereof.

37. The particulate trap of claim 36, wherein each of said filters has a three-dimensionally reticulated porous member carrying a catalyst provided on both sides thereof.

38. The particulate trap of claim 29, wherein said filters have alumina whiskers thereon.

* * * * *